United States Patent [19]
Sarno et al.

[11] Patent Number: 6,141,636
[45] Date of Patent: *Oct. 31, 2000

[54] LOGIC ANALYSIS SUBSYSTEM IN A TIME-SLICED EMULATOR

[75] Inventors: Tony R. Sarno, Scotts Valley; Ingo Schaefer, Sunnyale; John E. Chilton, Soquel; Mark S. Papamarcos, San Jose; Bernard Y. Chan, Fremont; Michael C. Tsou, Los Altos, all of Calif.

[73] Assignee: Quickturn Design Systems, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/831,501

[22] Filed: Mar. 31, 1997

[51] Int. Cl.[7] .................................................... G06F 9/455
[52] U.S. Cl. ............................................... 703/23; 703/28
[58] Field of Search .............................. 395/527, 500.44, 395/500.49; 703/23, 28

[56] References Cited

U.S. PATENT DOCUMENTS

| | | | |
|---|---|---|---|
| 4,306,286 | 12/1981 | Cocke et al. ............................. | 364/200 |
| 4,656,580 | 4/1987 | Hitchcock, Sr. et al. ............. | 364/200 |
| 4,697,241 | 9/1987 | Lavi ........................................ | 364/488 |
| 4,914,612 | 4/1990 | Beece et al. ............................ | 364/578 |
| 5,036,473 | 7/1991 | Butts et al. ............................. | 364/489 |
| 5,109,353 | 4/1992 | Sample et al. .......................... | 364/578 |
| 5,329,470 | 7/1994 | Sample et al. .......................... | 364/578 |
| 5,392,420 | 2/1995 | Balmer et al. .......................... | 395/500 |
| 5,425,036 | 6/1995 | Liu et al. ................................. | 371/24 |
| 5,452,239 | 9/1995 | Dai et al. ................................ | 364/578 |
| 5,475,830 | 12/1995 | Chen et al. ............................. | 395/500 |
| 5,551,013 | 8/1996 | Beausoleil et al. .................... | 395/500 |
| 5,596,742 | 1/1997 | Agarwal et al. ........................ | 395/500 |
| 5,644,515 | 7/1997 | Sample et al. .......................... | 364/578 |
| 5,649,176 | 7/1997 | Selvidge et al. ........................ | 395/551 |
| 5,659,716 | 8/1997 | Selvidge et al. ........................ | 395/500 |
| 5,680,583 | 10/1997 | Kuijsten ................................. | 364/488 |
| 5,754,827 | 5/1998 | Barbier et al. .......................... | 395/500 |
| 5,761,484 | 6/1998 | Agarwal et al. ........................ | 395/500 |
| 5,777,489 | 7/1998 | Barbier et al. ............................ | 326/40 |
| 5,790,832 | 8/1998 | Barbier et al. .......................... | 395/500 |
| 5,802,348 | 9/1998 | Stewart et al. .......................... | 395/500 |
| 5,819,065 | 10/1998 | Chilton et al. .......................... | 395/500 |
| 5,822,564 | 10/1998 | Chilton et al. .......................... | 395/500 |
| 5,884,066 | 3/1999 | Kuijsten ................................. | 395/500 |
| 5,886,904 | 3/1999 | Dai et al. ................................ | 364/578 |
| 5,920,712 | 7/1999 | Kuijsten ................................. | 395/500 |
| 5,923,865 | 7/1999 | Chilton et al. .......................... | 395/500 |

OTHER PUBLICATIONS

European Search Report.

*Primary Examiner*—Kevin J. Teska
*Assistant Examiner*—Hugh Jones
*Attorney, Agent, or Firm*—Lyon & Lyon LLP

[57] ABSTRACT

A logic analysis subsystem in a time-sliced emulator. The logic analysis subsystem "reconstructs" signals that were previously reduced by the compiler and allows the user to set breakpoints and triggers using these and other signals of the emulated circuit. The present invention includes a "logic analysis subsystem compiler" and "logic analysis subsystem hardware." The logic analysis subsystem compiler is either a subpart of the regular emulator compiler or is a standalone compiler. It compiles the design to be emulated and generates control instructions for the logic analysis subsystem hardware. The logic analysis subsystem hardware is incorporated into the time-sliced emulator to receive signals generated by the emulator during emulation. When the logic analysis subsystem operates, the control instructions cause the logic analysis subsystem to reconstruct previously reduced signals received from the emulator. These signals (along with the signals received from the emulator) may be used by the user to set breakpoints and triggers in the logic analysis subsystem.

1 Claim, 18 Drawing Sheets

CHASSIS (1-C)

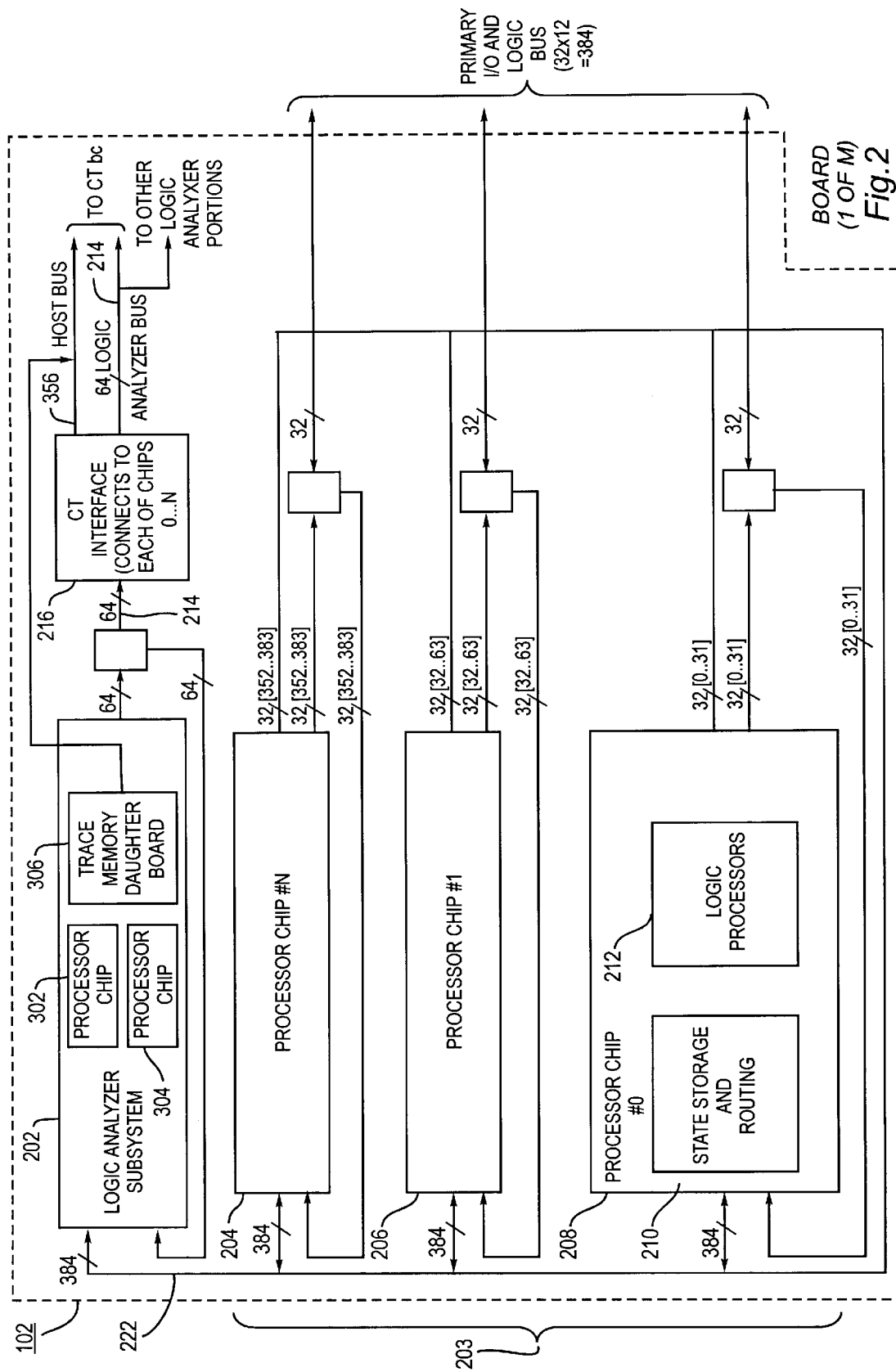

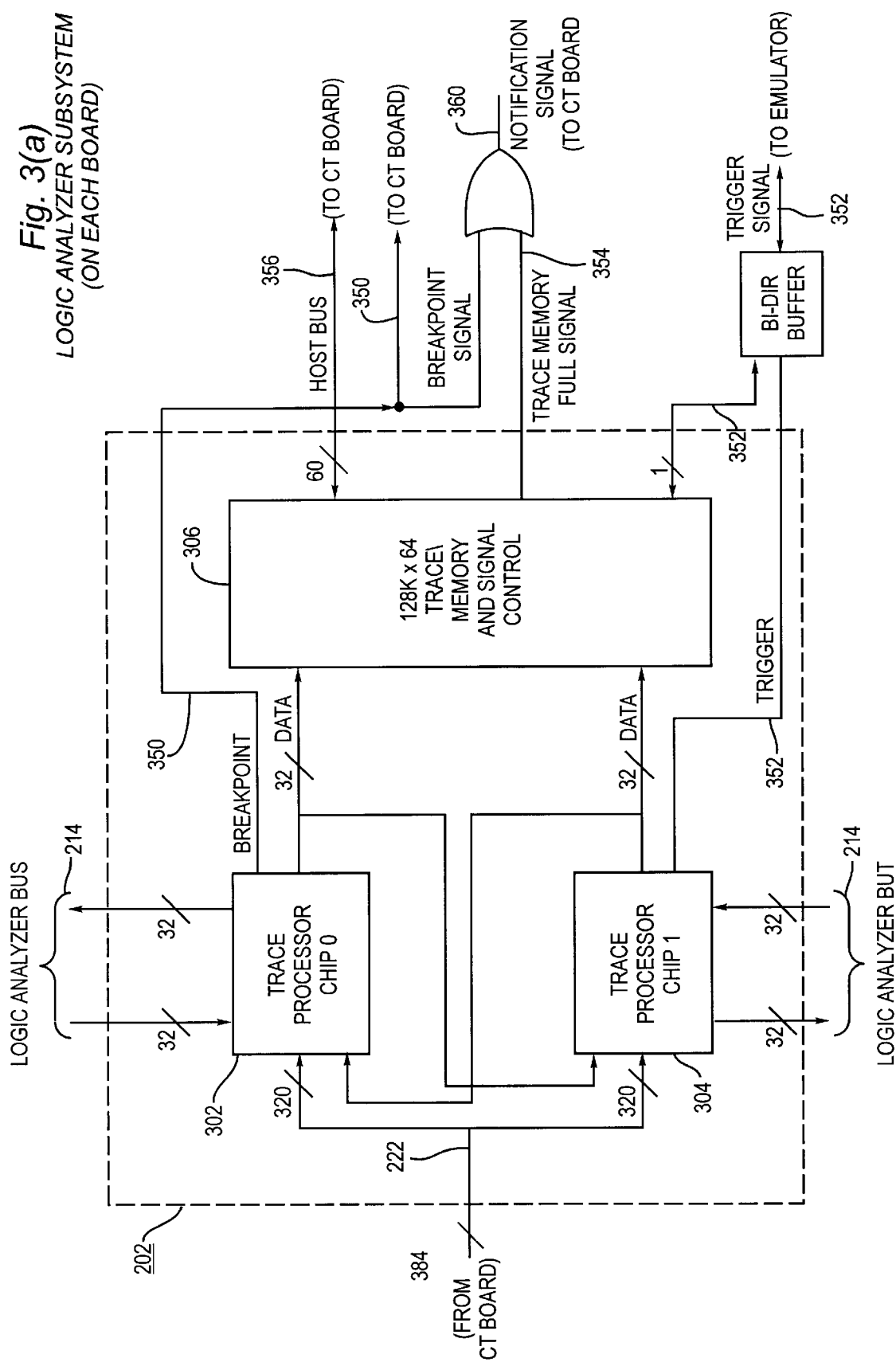

LOGIC ANALYZER SUBSYSTEM

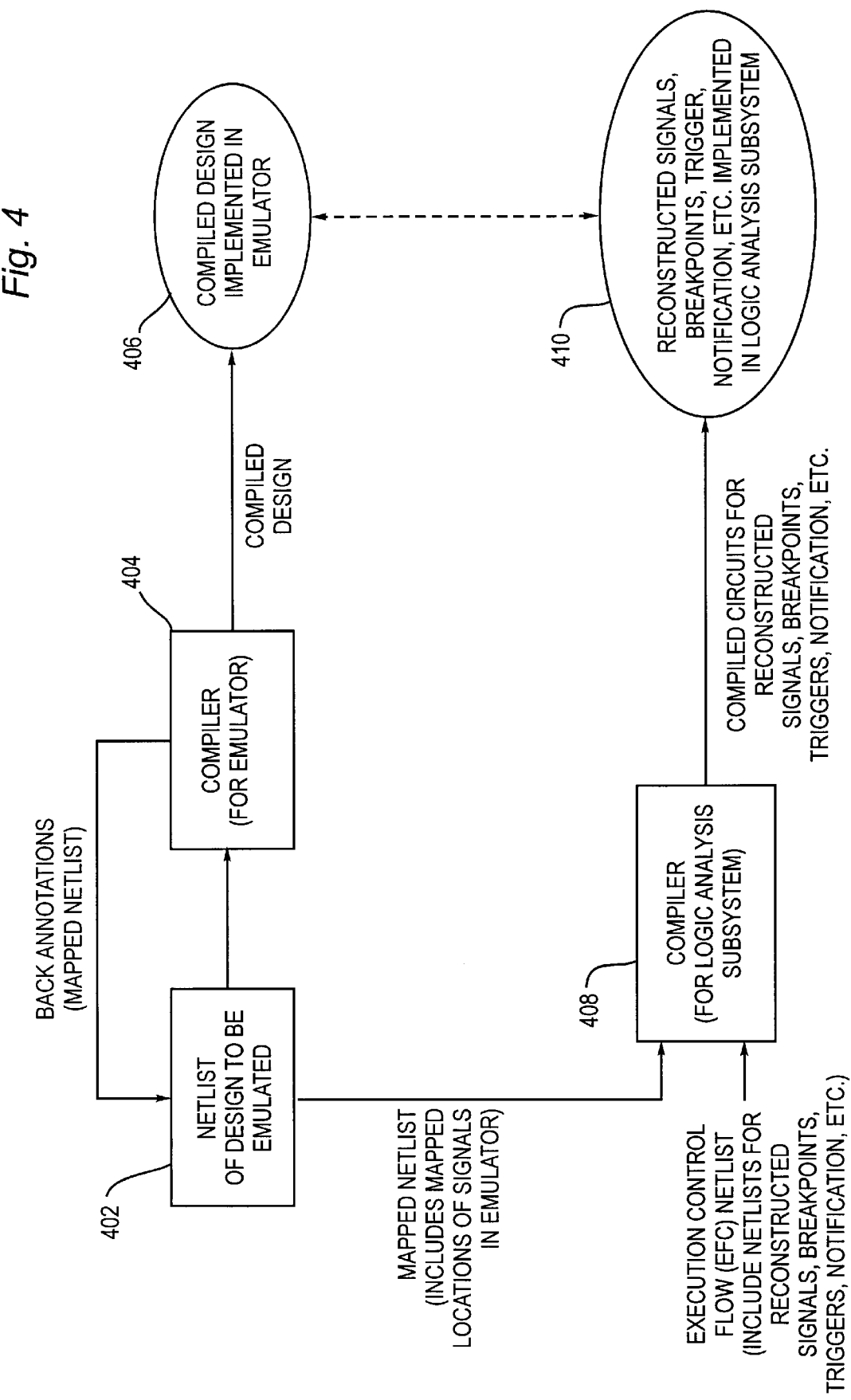

USER DESIGN MAPPING TO THE EMULATOR

PROCESSOR I/O'S

SETTING A BREAKPOINT
NETLIST GENERATED BY TRACE COMPILER IF USER SETS BREAKPOINT AS:
IF J AND N THEN BREAK

SETTING A NOTIFICATION
NETLIST GENERATED BY TRACE COMPILER IF USER SETS NOTIFICATION AS:
IF J AND N THEN NOTIFY

SETTING A TRIGGER
NETLIST GENERATED BY TRACE COMPILER IF USER SETS TRIGGER AS:
IF J AND N THEN TRIGGER

NETLIST GENERATED BY TRACE COMPILER FOR
MULTIPLE POSSIBLE BREAKPOINTS (CHOOSABLE
BY USER DURING EMULATION)

LOGIC ANALYSIS SUBSYSTEM IN A TIME-SLICED EMULATOR

RELATED APPLICATIONS

This application is related to the following copending applications, which are herein incorporated by reference
1. U.S. application Ser. No. 08/197,430, entitled "Method and Apparatus for a Trace Buffer in an Emulation System," of Kuijsten, filed Feb. 16, 1994;
2. U.S. application Ser. No. 08/242,164, entitled "Emulation System Having Multiple Emulator Clock Cycles Per Emulated Clock Cycle," of Kuijsten, filed May 13, 1994;
3. U.S. application Ser. No. 08/496,239, entitled "Emulation System Having Multiple Emulated Clock Cycles Per Emulated Clock Cycle and Improved Signal Routing," of Chilton et al., filed Jun. 28, 1995; and
4. U.S. application Ser. No. 08/597,197, entitled "System and Method for Emulating Memory," of Chilton et al., filed Feb. 6, 1996.

APPENDICES

This document contains the following appendices, which are incorporated in and constitute a part of this specification and which are herein incorporated by reference:
1) Appendix A contains verilog code describing the functionality of a controller in a logic analysis subsystem of a preferred embodiment of the present invention.
2) Appendix B contains a further description of details of the controller of Appendix A.

FIELD OF THE INVENTION

This application relates to simulation of digital circuits via a hardware emulator and, specifically, to a method and apparatus for implementing a logic analysis subsystem for debugging circuits in such an emulator.

BACKGROUND OF THE INVENTION

As electronic circuit designs continue to increase in speed and complexity, it becomes ever more critical to test the developing circuit designs at various stages of development. Hardware emulators provide a means to test complex circuit designs as the designs are being developed. Such emulators typically provide configurable hardware that is controlled by software to perform the functions of a circuit being designed. The circuit design is specified by a set of data that defines the circuit structure and behavior. The emulator is often connected to a "target system," which is the actual circuit with which the circuit design will eventually operate.

Emulators operate under software control. The circuit design is "compiled" to produce the program that controls the emulator. Because an emulator must perform the functionality of a wide range of circuit designs, it should be as flexible as possible. This means the emulation system must contain logic processing hardware that is reusable for different designs. Such an emulation system would contain a large number of general purpose processing elements that are used to indirectly perform the function of the circuit being emulated. For example, a general purpose emulator would process multiple Boolean logic equations to emulate a multiplier circuit rather than use a dedicated hardware multiplier for the same purpose that would then become unusable in the emulation of circuit designs that do not contain any multiplier functions. In order to solve these equations, many gates, or other devices, in the emulator must be provided with signals. Further, the outputs of the gates or other components must be routed efficiently among the various components of the emulator.

Conventional emulators are used to develop and test designs. To this end, it is desirable to be able to monitor various signals during the emulation process. In conventional emulators, however, certain signals are not available for monitoring because they are lost during the compilation process. The compiler takes a description of the design to be emulated and turns it into control instructions for the emulator. This process "reduces" certain groups of signals in the design. Reduced signals are not available for observation during the emulation process. What is needed is a way to let the user "see" reduced signals. Such a functions would enhance the user's ability to debug and test the circuit being emulated.

In addition, it is desirable to allow the user to set breakpoints and triggers during the emulation process. It is also desirable to allow the user to dump the contents of signals in the emulator to an external computer of workstation during emulation.

SUMMARY OF THE INVENTION

The present invention overcomes the problems and disadvantages of the prior art by implementing a logic analysis subsystem (also called a trace subsystem) in a time-sliced emulator. The logic analysis subsystem "reconstructs" signals that were previously reduced by the compiler and allows the user to set breakpoints and triggers using these and other signals of the emulated circuit.

A preferred embodiment of the present invention includes a "logic analysis subsystem compiler" and "logic analysis subsystem hardware." The logic analysis subsystem compiler is either a subpart of the regular emulator compiler or is a standalone compiler. It compiles the design to be emulated and generates control instructions for the logic analysis subsystem hardware. The logic analysis subsystem hardware connects to the time-sliced emulator to receive signals generated by the emulator during emulation. When the logic analysis subsystem operates, the control instructions generated by the logic analysis subsystem compiler cause the logic analysis subsystem to reconstruct previously reduced signals received from the emulator. These signals (along with the other signals received from the emulator) may be used by the user to set breakpoints and triggers in the logic analysis subsystem.

A preferred embodiment of the present invention is coupled to a workstation or other general purpose computer and allows the user to control the configuration of the logic analysis subsystem. The logic analysis subsystem outputs an interrupt signal to the workstation on occurrence of a user specified breakpoint or trigger condition or when the trace memory is full (and the logic analysis subsystem is not in a mode that allows it to overwrite its memory when the memory is full).

An emulator with which a logic analysis subsystem in accordance with the present invention operates contains up to four chassis. Each chassis contains up to eight emulator boards. Each emulator board contains up to twelve emulator processor chips and also includes a portion of the logic analysis subsystem. Each of the eight boards is coupled to a 384 bit bus of the time-sliced emulator. During every user clock cycle, output from the emulator is also sent to the logic analysis subsystem via this bus In accordance with the purpose of the invention, as embodied and broadly described herein, the invention is a logic analysis subsystem coupled to an emulation system, the logic analysis subsystem comprising: input lines receiving values output from the emulation system; at least one processor chip implementing a probe function in accordance with signals received on the input lines; and a controller controlling the operation of the probe function in accordance with instructions received from the at least one processor chip.

In further accordance with the purpose of this invention, as embodied and broadly described herein, the invention is a method of compiling a functional circuit design so that it can be traced by a logic analysis subsystem, the method performed by a data processor system, comprising the steps of: storing, in a memory, a plurality of output signals that will be available from an emulator system during emulation; receiving a description of a reduced signal needed by the logic analysis subsystem, where the reduced signal includes a description of how the output signals are used to generate the reduced signal; determining the contents of a second circuit that receives the output signals and generates the reduced signal in accordance with the description of the reduced signal; and compiling the second circuit so that it can be implemented by the logic analysis subsystem to reconstruct the reduced signal.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 is a block diagram in which one board of the emulator of FIG. 1 is shown connected to a portion of a logic analysis subsystem in accordance with the present invention.

FIG. 3(a) is a block diagram of the logic analysis subsystem of FIG. 2.

FIG. 4 is a block diagram showing inputs and outputs of an emulator compiler and a logic analysis subsystem compiler in a first preferred embodiment of the present invention.

DETAILED DESCRIPTION OF SEVERAL PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

The following paragraphs provide an overview of the hardware of an emulator usable in conjunction with the present invention and an overview of a logic analysis subsystem in accordance with the present invention.

Figure 1:
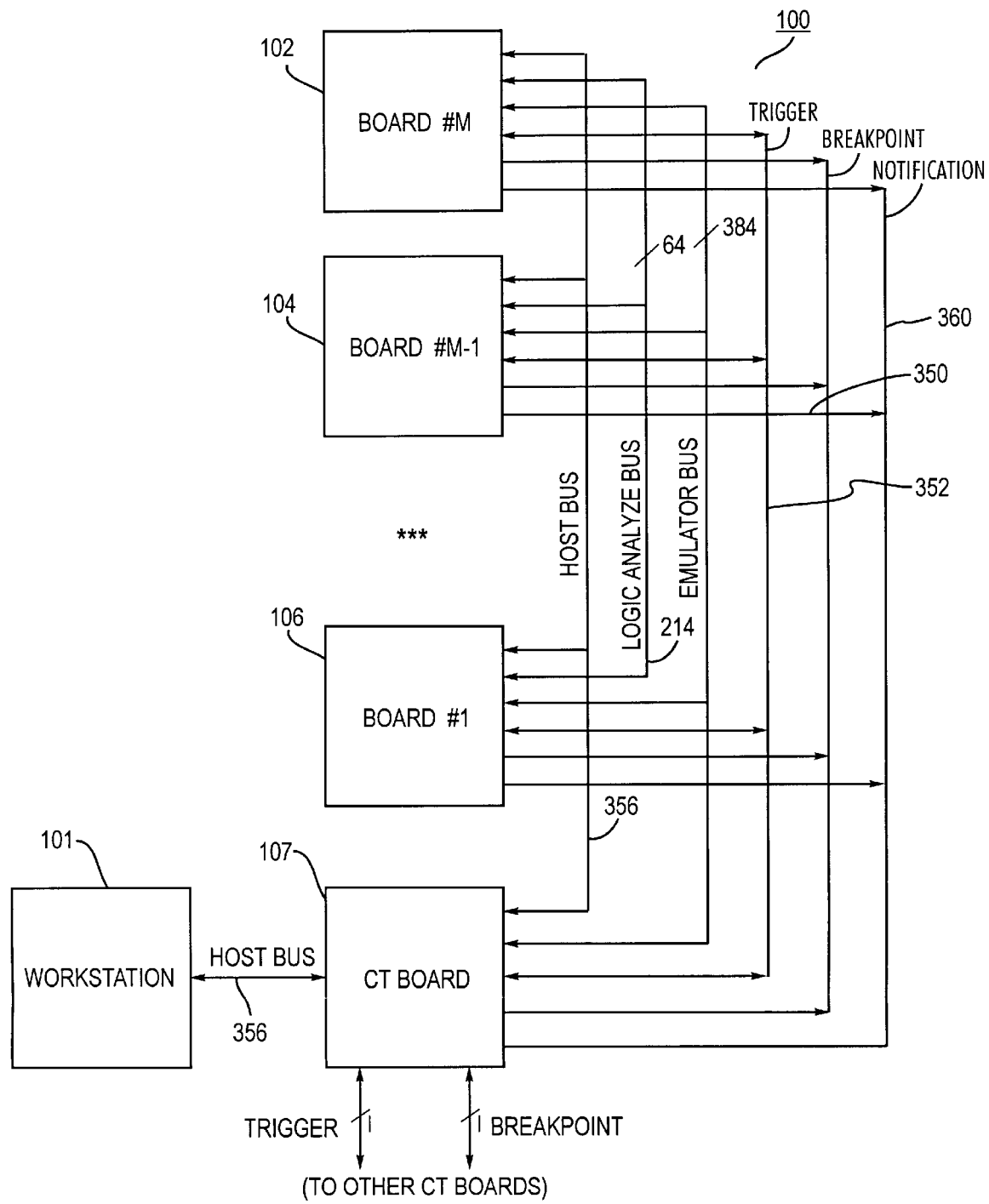
FIG. 1 is a system level block diagram of an emulator with which a preferred embodiment of the present invention operates.

FIG. 1 is a system level block diagram of an emulator 100 with which a preferred embodiment of the present invention operates. Such an emulator can be, for example, a time-sliced emulator as described in U.S. application Ser. No. 08/496,239 entitled "Emulation System Having Multiple Emulated Clock Cycles Per Emulator Clock Cycle and Improved Signal Routing," of Chilton et al., filed Jun. 28, 1995, which is herein incorporated by reference. Emulator 100 preferably includes a number (C) of chassis, each of which, as shown in FIG. 1, contains M boards 102 ... 106 coupled via a 384 bit bus. In one version of the emulator, C=4 and M=8. Thus, there are four chassis and eight boards in each chassis.

Emulator 100 allows the implementation of a technology mapped user design over a series of time-slices or program steps. A technology mapping process (compiler) converts portions of the user design (e.g., a netlist) to a form that can be placed in the processing elements of the physical hardware. After this process, only the design nodes that are available at either the inputs or the outputs of the processing elements in the emulator are visible to external hardware for probing.

FIG. 1 also includes a CT (controller) board 107, as described in U.S. application Ser. No. 08/496,239, and a workstation 101, which connects to CT board 107 via host bus 356.

FIG. 2 is a block diagram of one board 102 of the emulator of FIG. 1. In a preferred embodiment of the present invention, each board 1 . . . M contains a part of the logic analysis subsystem 202. Board 102 includes a portion of logic analysis subsystem 202 and a logic processing system 203. Each board in the emulator subsystem 203 includes N processor chips 204 through 208, where N=12. Each portion of the logic analysis subsystem 202 includes two processor chips 302 and 304 ("trace processor chips") and a controller/trace memory 306. Each processor chip in the emulator 203 is connected by the 384 bit emulator bus. The trace processor chips 302 and 304 in the logic analysis subsystem also receive the 384 bit emulator bus.

The emulator subsystem 203 computes the primary outputs of a user design from primary inputs of the design and the internal design state on the 384 bit bus. During the computation of emulator 203, values generated by chip outputs appear on the 384 bit logic bus. Using these intermediate values as inputs, the logic analysis subsystem 202 implements flexible and powerful debugging features without lowering the logic capacity or performance of the emulator 203. This is accomplished by using additional time-sliced logic resources in logic analysis subsystem 202 (i.e., trace processor chips 302 and 304). By programming logic analysis subsystem 202, the following features can be added:

1) User nodes that are not already available on the logic bus for direct probing because they were removed during technology mapping/compilation can be "reconstructed." This means that when the user selects a node for probing and it is not available on the logic bus, the logic needed to create the node from inputs that are available on the bus will be generated (at compile time) and implemented in the logic analysis subsystem 202.

2) In addition to node reconstruction, the resources in the logic analysis subsystem can be programmed with various logic needed to generate trace capture triggers, breakpoints, and workstation interrupt signals. The logic associated with these signals is also generated at compile time and can be arbitrarily complex within the limits of the logic resources available and can contain sequential elements and/or memory values. Breakpoints, triggers, notification events, etc. are called by the general name "probe functions."

Figure 19:
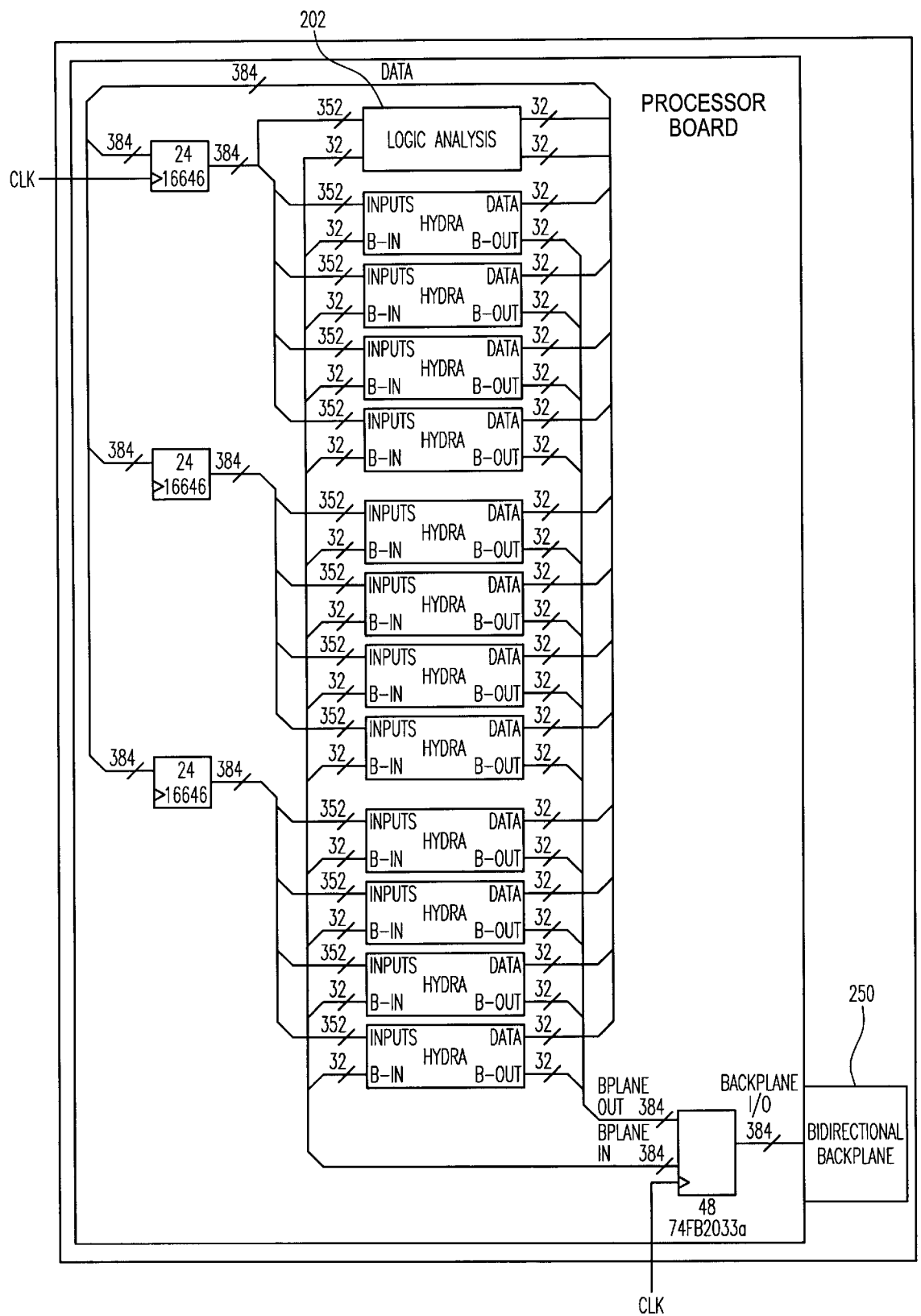
FIG. 19 shows a board level configuration of twelve Hydra processor chips and a portion of the logic analysis subsystem.

A slightly more detailed version of FIG. 2 is shown in FIG. 19.

FIG. 3(a) is a block diagram of the logic analysis subsystem 202 of FIG. 2. Subsystem 202 includes two trace processor chips 302 and 304, each of which receives 320 inputs from the 384 bit emulator bus (256 bits of the bus are sent to both and the remaining 128 bits are evenly split between the trace processor chips). Other implementations of the present invention may include different numbers of trace processor chips. The trace processor chips 302 and 304 function in essentially the same manner as the processor chips 1 . . . N in subsystem 203 of FIG. 2, which are described in detail below. Trace memory, which is a 128K× 64 memory, and controller 306 are also described below in detail.

Controller 306 is coupled to a 60 bit host bus 356 that interfaces (via CT board 107 of the emulator) to workstation 101. The host bus preferably uses a MXI interface, defined and manufactured by National Instruments Corporation, but can use any appropriate interface that allows the controller to communicate with a workstation or with some other external device or controller. Memory/controller 306 also outputs a plurality of other signals. These signals include a NOTIFICATION signal 360, which is generated by ORing together a BREAKPOINT signal generated from trace processor chip 302 and a TRACE MEMORY FULL signal generated by the controller 306. The notification signal is sent to CT board 107, and from there to workstation 101. Thus, the NOTIFICATION signal is activated when a breakpoint condition occurs or when the memory 306 is full (and the memory is not set to a mode where it can rewrite memory). The effect of the NOTIFICATION signal depends on the functionality of the workstation. For example, the workstation could send commands to the memory/controller via interface 310 when it receives a notification. Similarly, the workstation might select new breakpoints, trigger, or notification conditions (as described below in connection with FIG. 12(b)) in reaction to a notification signal.

As another example, the workstation could send a command to read the contents of memory when it receives a trace memory full signal. In a preferred embodiment, the workstation halts the logic analysis subsystem and sends a command on host bus 356 to read memory 306. In response to such a command, the controller sends the contents of memory 306 to the workstation over the MXI bus interface.

The logic analysis subsystem also sends the BREAKPOINT signal itself to the CT board 107. The TRIGGER signal is sent to each of the other boards in the emulator 203. The TRIGGER signal can cause the trace memory subsystems to capture probe data. The exact configuration of probe signals sent by the logic analysis subsystem differ in various embodiments of the present invention. Similarly, the probe signals may have different names or designations and may have different origination or destination points, as long as they are set by execution of a compiled netlist by one or more of the trace processor chips in the logic analysis subsystem.

Figure 3B:
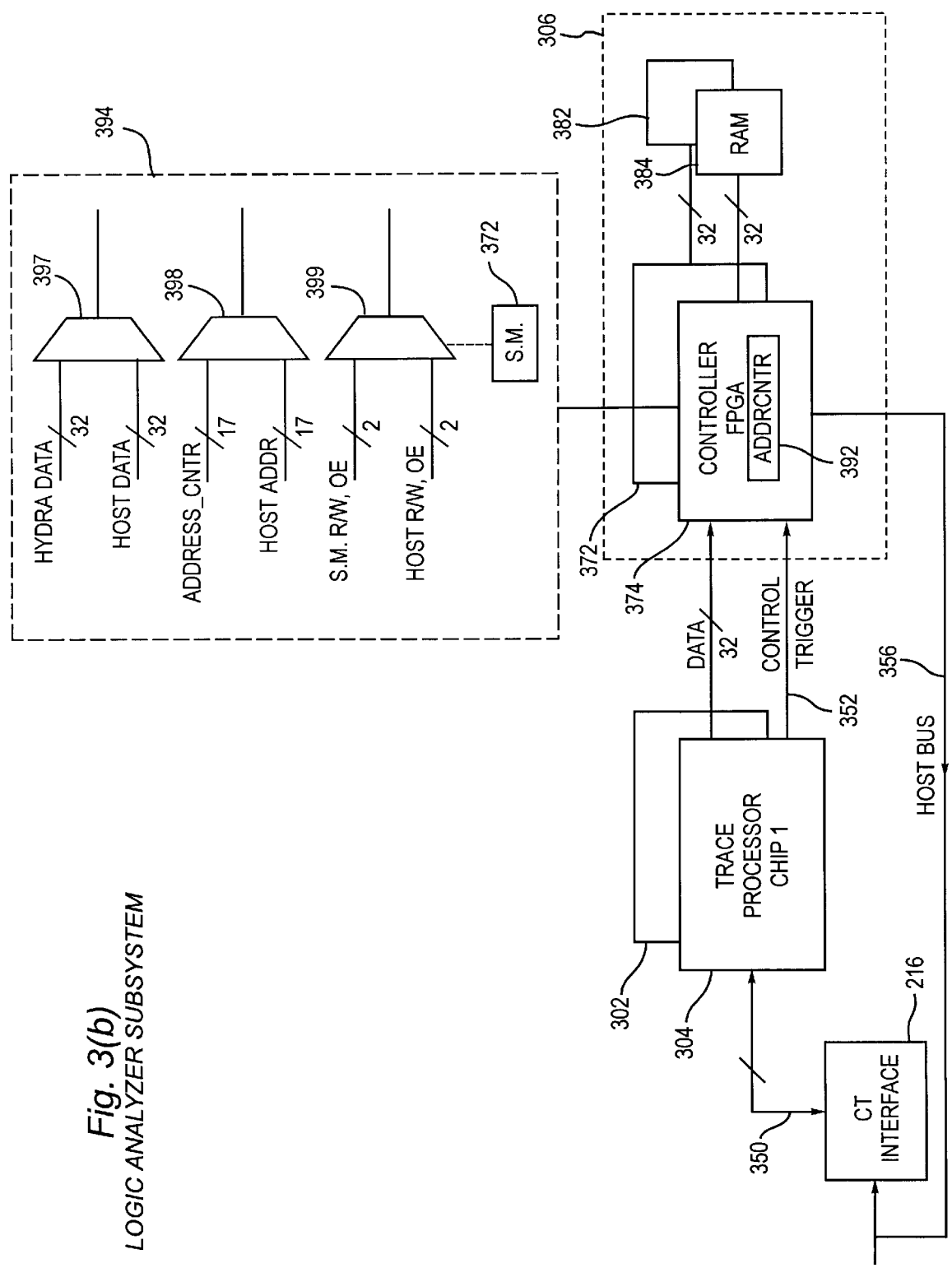
FIG. 3(b) is a block diagram showing more details of a controller of the logic analyzer subsystem of FIG. 3(a).

FIG. 3(b) is a block diagram showing more details of a controller of the logic analyzer subsystem of FIG. 3(a). FIG. 3(b) shows the trace processor chips 302 and 304, along with details of the controller/memory 306. Controller memory 306 preferably includes two controllers 372 and 374, each of which is respectively coupled to trace processor chips 302 and 304 by a 32 bit data line and trigger line 352 (as shown in FIG. 3(a)). Each controller 372, 374 is respectively connected to a memory such as 128K×32 RAMs 382, 384. In the described embodiment, each controller 372, 374 is implemented as an FPGA. Each FPGA includes an address counter 392 and implements a function as described in the verilog code attached hereto as Exhibit A. Exhibit B describes additional functionality of the controllers 372, 374. Other embodiments of the invention may implement the functionality of controllers 372, 374 using other technology, such as ASICs.

Part of the functionality implemented in controllers 372, 374 is shown in blown-up section 394 of FIG. 3(b). This functionality includes a selector 397 that selects between 32 bit data from the trace processor chip and 32 bit data from the host bus; a selector 398 that selects between 17 bit address data from the trace processor chip and 17 bit address data from the host bus; and a selector 399 that selects a 1 bit read/write enable data and a 1 bit output enable data from either the host or a state machine of the controllers 372 and 274. Each controller 372, 374 also implements a state machine 396 controlled by address counter 392, as described functionally in Appendix A. As shown in the Figure, the state machine controls the operation of the selectors in section 394.

FIG. 4 is a block diagram showing inputs and outputs of an emulator compiler and a logic analysis subsystem compiler in a first preferred embodiment of the present invention. Compilation has two independent stages. First, a netlist 402, describing a design to be emulated is compiled by emulator compiler 404 to yield a compiled design, which will be executed by the emulator 203, in element 406.

A second compilation stage may either be implemented as a part of the emulator compilation or may be executed separately. When the compiler 404 compiles the design for the emulator, it generates a "mapped netlist" that contains the signals assigned to the inputs and outputs of the processor chips of the emulator on the 384 bit bus. The mapped netlist also contains information specifying the signals that were reduced by the compiler (so that it can be determined which signals to reconstruct). During the second compilation phase, the mapped netlist and an Execution Control Flow (ecf) netlist is sent to compiler 408, which generates compiled circuits that, respectively: 1) reconstruct signals reduced by the compiler 404 and 2) implement breakpoints, triggers, notifications, etc. specified by the user at compilation time. These additional compiled circuits are implemented by the logic analysis subsystem 202, as shown in element 410. The ecf netlist is a netlist for a circuit implementing the circumstances under which breakpoints, etc. should be set. Such a circuit might contain, for example, elements 1008 and 1010 of FIG. 10, which AND signals from the emulator and activate the BREAKPOINT signal. The ecf netlist can be, for example, a Verilog netlist generated by any appropriate method, such as by using Design Compiler, available from Synopsys, Inc. of Mountain View, Calif. Alternately, a specialized user interface may allow the user to specify breakpoints, etc. graphically and may generate the ecf netlist from the user input. As also shown in the Figure, the emulator and the logic analysis subsystem exchange information during execution, such as information on the 384 bit emulator bus and probe signals.

Figure 5:
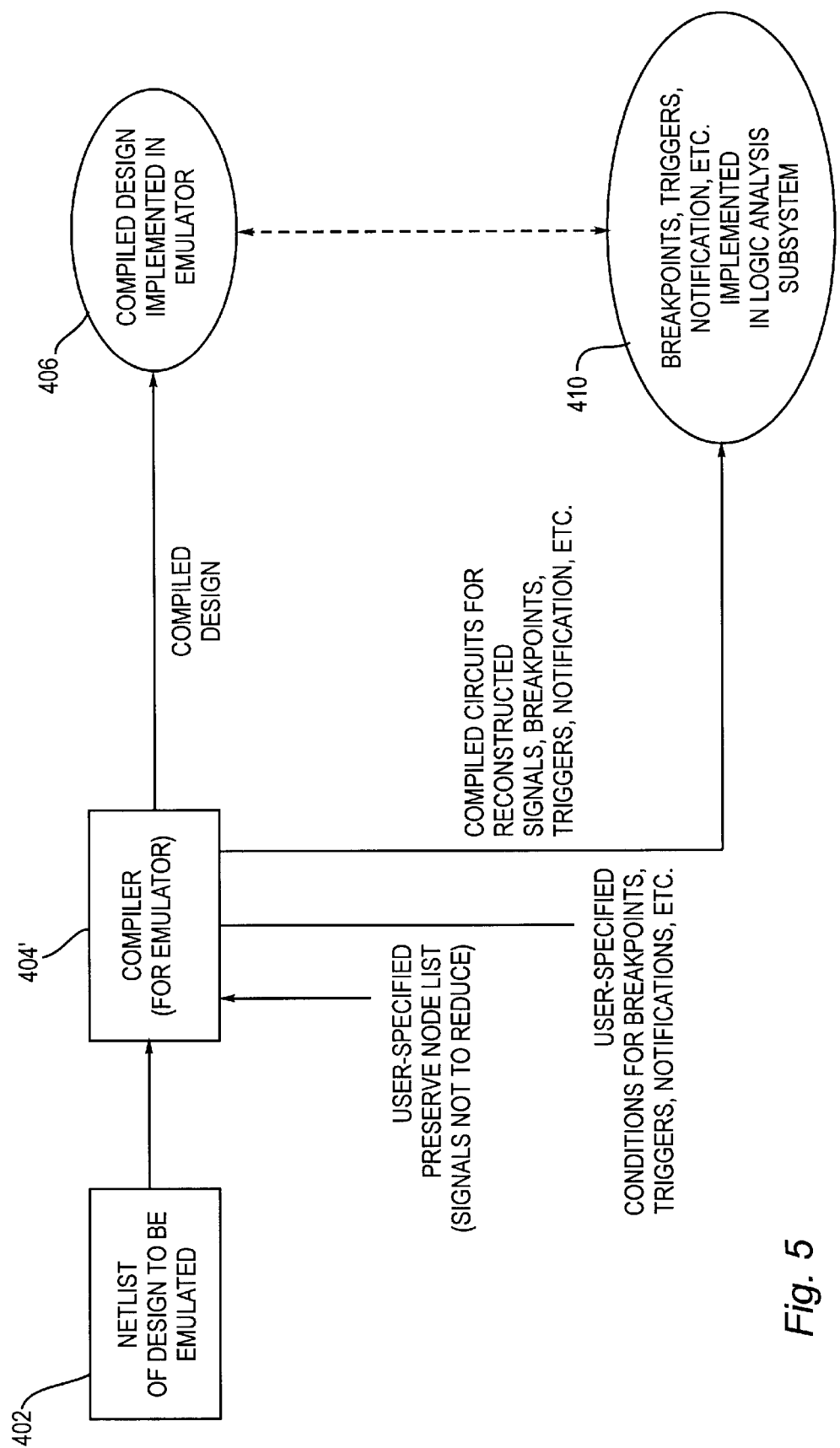
FIG. 5 is a block diagram showing inputs and outputs of an emulator compiler in a second preferred embodiment of the present invention.

FIG. 5 is a block diagram showing inputs and outputs of an emulator compiler in a second preferred embodiment of the present invention. In the embodiment of FIG. 5, the compiler 404' does not generate netlists to perform reconstruction, but, instead allows the user to input a "preserved node list" to compiler 404' that indicates which signals should not be reduced. This generates a larger design, but makes the signals available to the logic analysis subsystem for setting of breakpoints, triggers, notification, etc. As also shown in the Figure, the emulator and the logic analysis subsystem exchange information during execution, as discussed above.

The following paragraphs describe an example of a design to be emulated, where certain signals are lost (i.e., reduced) during compilation by compiler 404. In the example, the user sets various breakpoints, triggers, and notification events that require reconstruction of the reduced signals.

Figure 6:
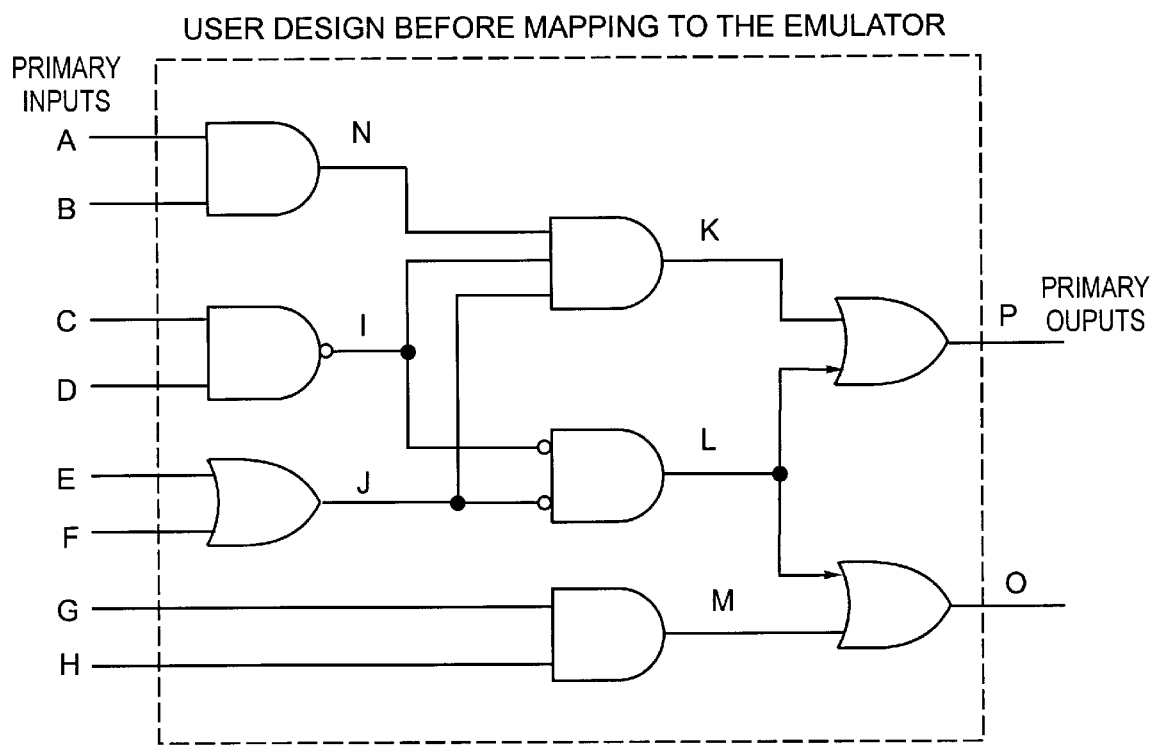
FIG. 6 shows an example of a circuit design to be emulated.
Figure 7:
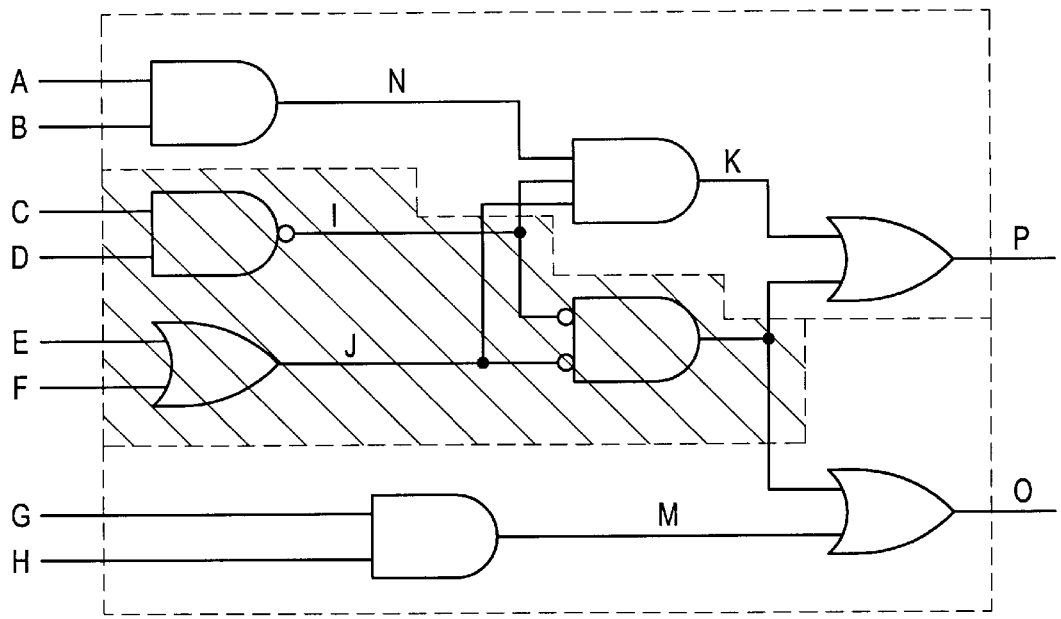
FIG. 7 shows the example of FIG. 6 after the emulator compiler has reduced signals in the design.
Figure 8:
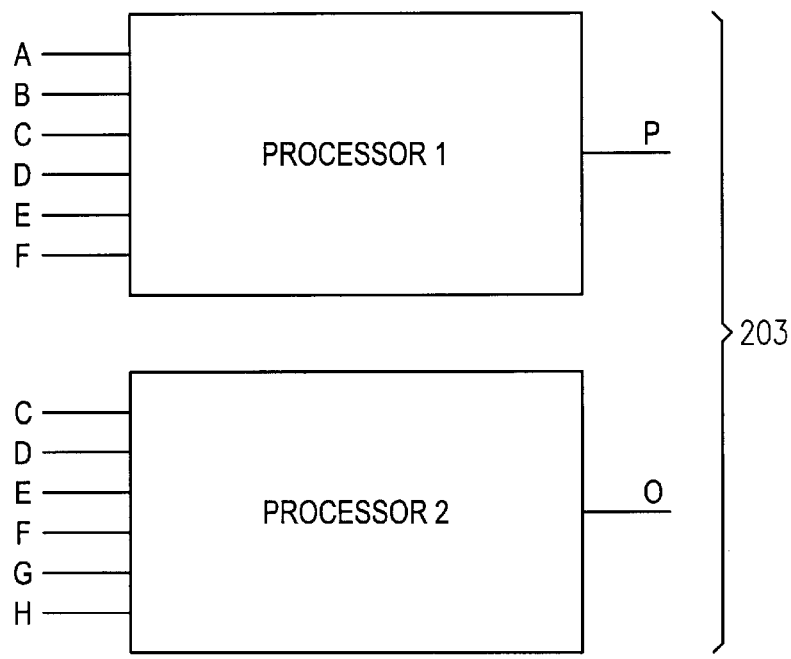
FIG. 8 shows an example of how the non-reduced signals of FIG. 7 are input to processors in the emulator.
Figure 9A:
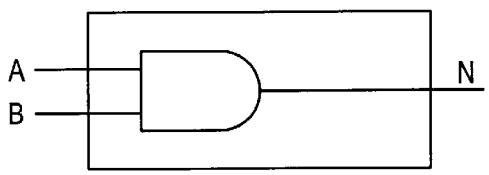
FIGS. 9(a) through 9(f) show the compiled circuits that need to be reconstructed by the logic analysis subsystem compiler so that the logic analysis subsystem can reconstruct and access previously reduced signals during emulation.
Figure 9D:
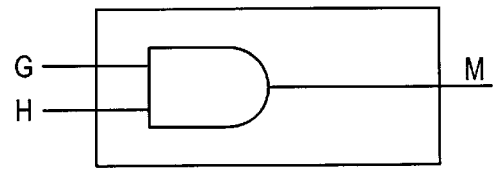
Figure 9B:
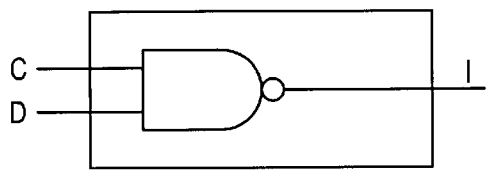
Figure 9E:
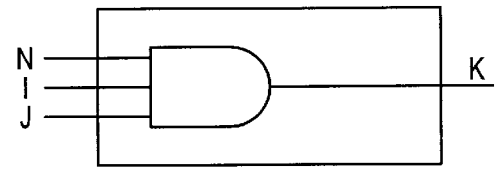
Figure 9C:
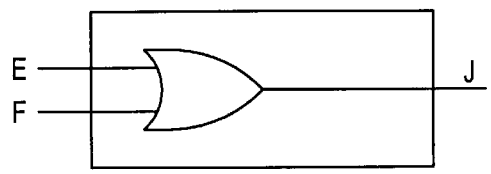
Figure 9F:
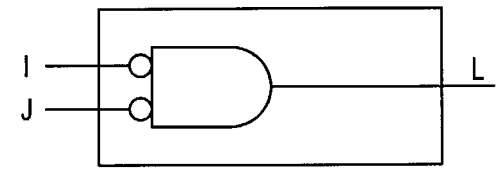

FIG. 6 shows an example of a user design to be emulated. The circuit contains sixteen different signals, including inputs A, B, C, D, E, F, G, and H; outputs P and O; and internal signals N, I, J, K, L, and M. FIG. 7 shows the example of FIG. 6 after the emulator compiler 404 has reduced signals in the design. In the example, the mapping process performed by the compiler removes the internal signals. FIG. 8 shows an example of how the non-reduced signals of FIG. 7 are input to processors in the emulator. In the example, signals A, B, C, D, E, and F are input to a first processor, while signals C, D, E, F, G, and H are input to a second processor. Note that, unless reconstruction is performed, only the input and output signals will be available to the logic analysis subsystem via the 384 bit bus.

FIGS. 9(a) through 9(f) show the netlists that need to be reconstructed by the logic analysis subsystem compiler so that the logic analysis subsystem can reconstruct and access previously reduced signals. These netlists are generated and compiled by compiler 404 of FIG. 4 and implemented by trace processor chips 302 and 304 of FIG. 3(a). Each compiled circuit in FIG. 9 uses the information in the mapped netlist to reconstruct the internal signals removed by compiler 404. In a preferred embodiment of the present invention, the reconstruction logic for one signal fits in a single processor.

Figure 10:
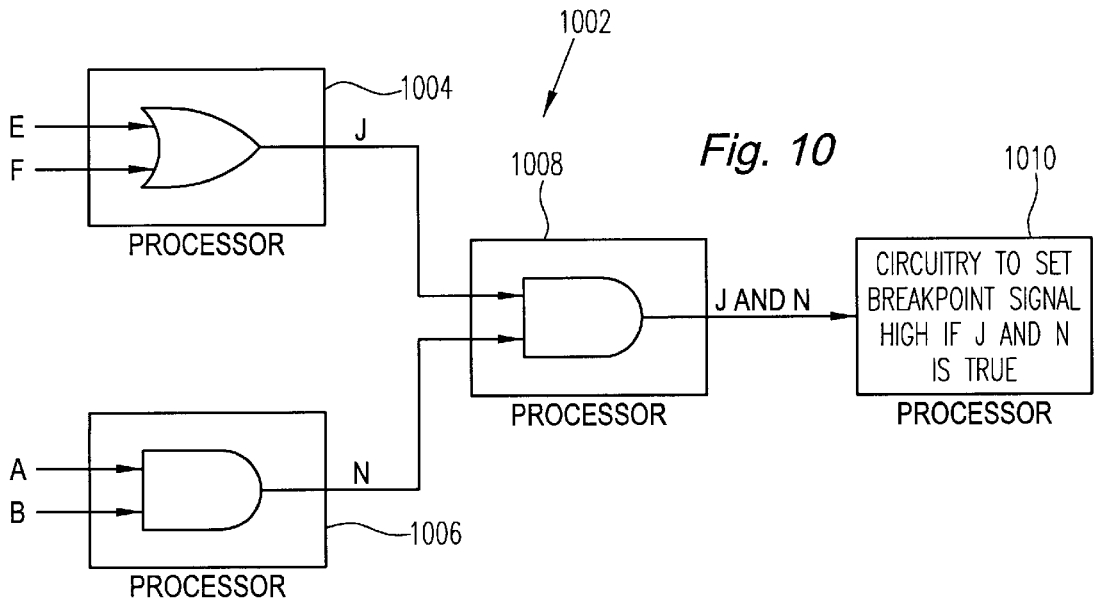
FIG. 10 is a schematic showing an example of a compiled circuit generated by the logic analysis subsystem compiler so that the logic analysis subsystem can generate a breakpoint signal.

FIG. 10 is a schematic showing an example of a compiled circuit generated by the logic analysis subsystem compiler so that the logic analysis subsystem can generate a breakpoint signal. In the example, the user has set a breakpoint to occur when (J AND N) is true. Thus, the logic analysis subsystem implements compiled circuits to reconstruct the signals J and N, to AND the reconstructed signals together, and to set the BREAKPOINT signal to active if the result of the AND operation is true.

Figure 11:
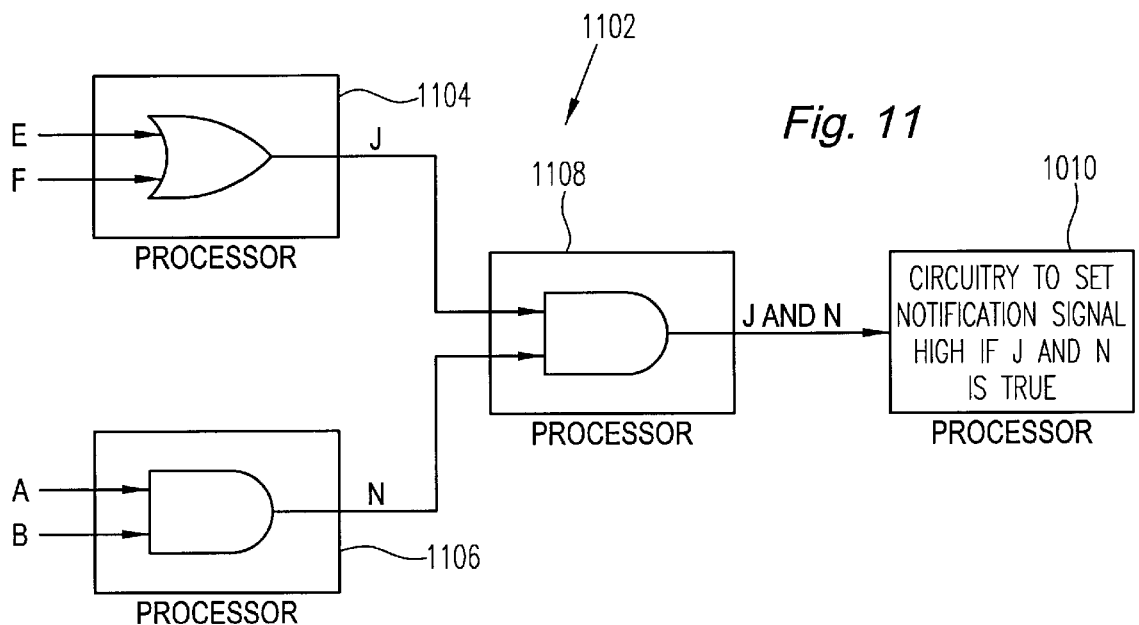
FIG. 11 is a schematic showing an example of a compiled circuit generated by the logic analysis subsystem compiler so that the logic analysis subsystem can generate a notification signal.

FIG. 11 is a schematic showing an example of a compiled circuit generated by the logic analysis subsystem compiler so that the logic analysis subsystem can generate a notification signal. Although the embodiment of FIG. 3(a) does not set the BREAKPOINT signal directly, an alternate embodiment also allows the BREAKPOINT signal to be set directly. In the example, the user has indicated that the workstation should be notified when (J AND N) is true. Thus, the logic analysis subsystem implements a compiled circuit to reconstruct the signals J and N, to AND the reconstructed signals together, and to set the NOTIFICATION signal to active if the result of the AND operation is true.

Figure 12A:
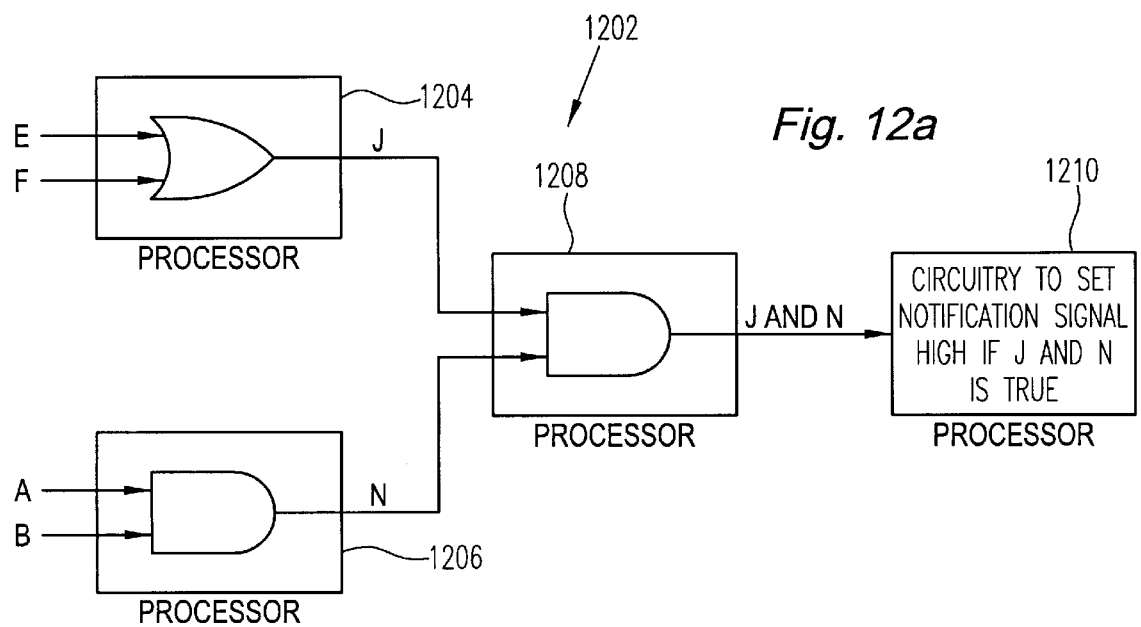
FIG. 12(a) is a schematic showing an example of a compiled circuit generated by the logic analysis subsystem compiler so that the logic analysis subsystem can generate a trigger signal.

FIG. 12(a) is a schematic showing an example of a compiled circuit generated by the logic analysis subsystem compiler so that the logic analysis subsystem can generate a trigger signal. In the example, the user has indicated that a trigger event occurs when (J AND N) is true. Thus, the logic analysis subsystem implements a compiled circuit to reconstruct the signals J and N, to AND the reconstructed signals together, and to set the TRIGGER signal to active if the result of the AND operation is true.

Figure 12B:
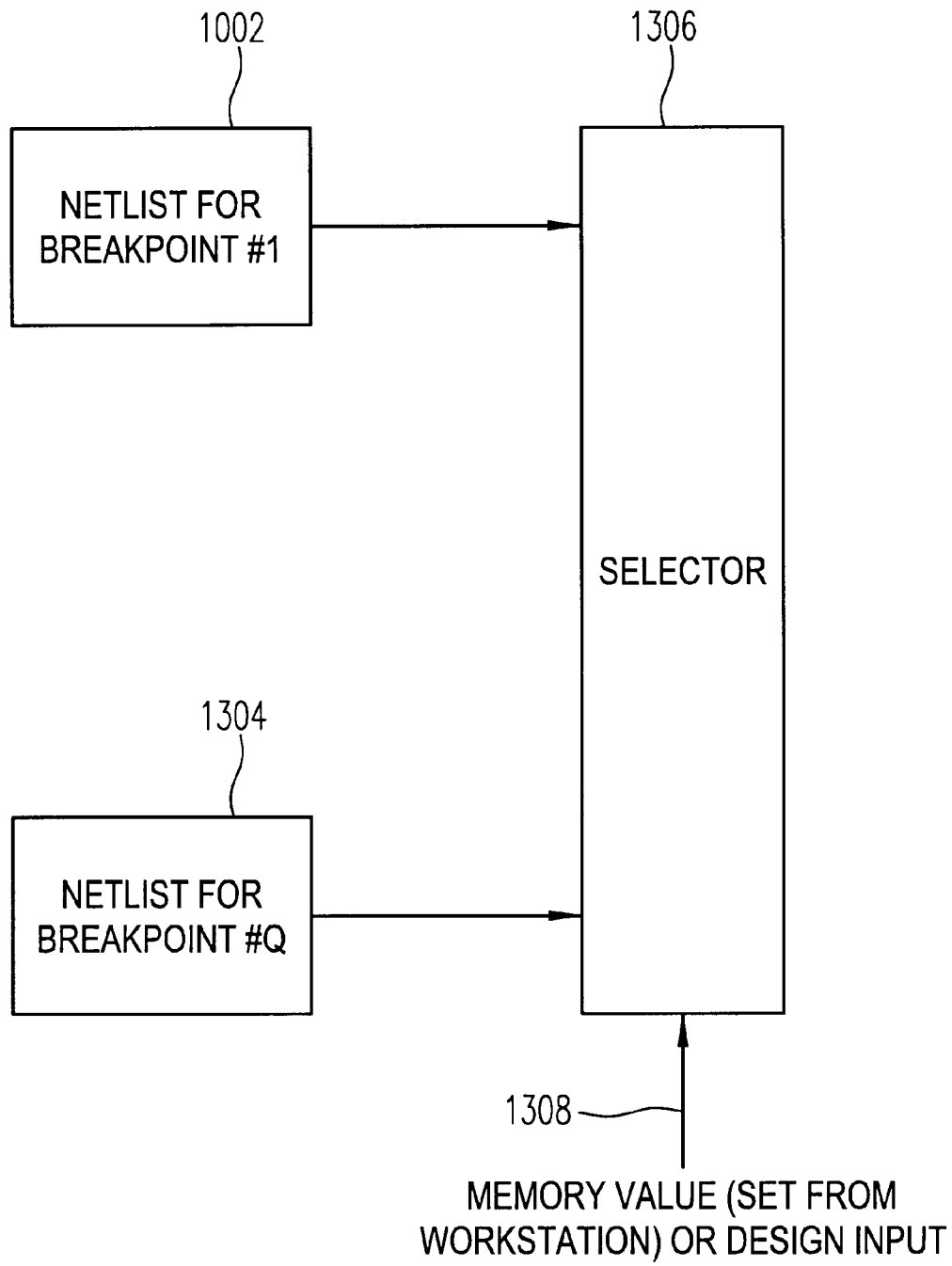
FIG. 12(b) shows an example of a compiled circuit generated by a compiler in a system that allows the breakpoints to be changed during operation of the emulator.

FIG. 12(b) shows an example of a compiled circuit generated by a compiler in a system that allows the breakpoints to be changed during operation of the emulator. Thus, the compiled circuit of FIG. 12(b) is constructed (as an ecf) by the user, compiled, and implemented by the hardware of the logic analysis subsystem if the user is going to want to switch breakpoints, etc. without stopping during emulation. The compiled circuit contains smaller compiled circuits 1002, 1304, etc. whose outputs are fed to a compiler selector 1306. Compiled selector 1306 selects one of the outputs, depending on a signal 1308, which can be, for example, a value set from the workstation (via memory mapping) or a value input from the design being emulated, or from a design input pin. (In the latter case, the design being emulated would have to be altered to generate such a value).

The following paragraphs provide additional detail about the emulator used with the present invention. Trace processor chips 302 and 304 in the logic analysis subsystem 202 on each emulator board are essentially the same as the Hydra processor chip described below.

Figure 13:
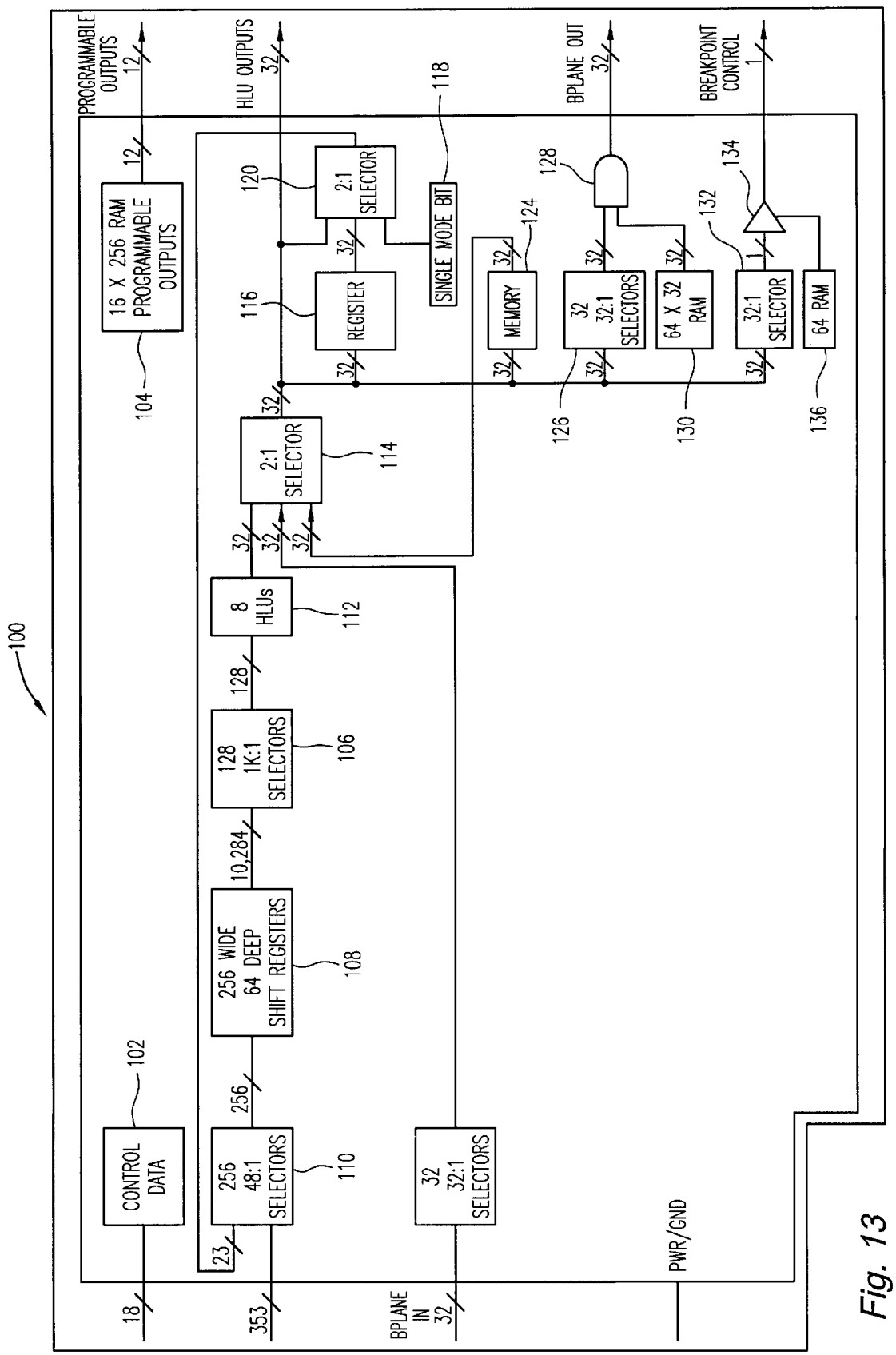
FIG. 13 is a system level block diagram of a single integrated circuit in the logic analysis subsystem of the present invention.

FIG. 13 is a system level block diagram of a single "chip" in an emulator used with a preferred embodiment of the present invention. The example discussed herein is intended to be produced as a commercial product known during development as the Hydra Logic Emulation System and referred to here as the "logic emulation system," developed by Arkos Design, Inc. The design shown at the system level as chip 100 in FIG. 13 is fabricated on a single integrated circuit (IC) package referred to as the Hydra Chip. Additional FIGS. 14–19 show board-level and block-level details of the logic emulator system. Although a specific embodiment of an emulator is discussed for illustrative purposes, the scope of the invention is not limited to this specific embodiment.

In FIG. 13, chip 100 includes various subcircuits for performing specific functions. The subcircuits are shown as blocks in FIG. 13, such as control data 102. In discussing the emulation system the architecture of the logic emulation system is presented in the section immediately below. Next, a detailed discussion of selected subcircuits in the logic emulation system is presented with a focus on subcircuits 106–112 which concern the selector and shift register routing of data to the Hydra logic units ("HLUs") that give the logic emulation system a special advantage in its ability to universally and uniformly route variable data among the HLUs. In a subsequent text section an example of compiling a circuit for execution in the emulation system is provided.

a. Logic Emulation System Architecture

In FIG. 13, control data 102 is used to store the microcode control words that direct the operation of the Hydra Chip ("chip"). In the described embodiment, control data 102 provides for 64 control words, each of approximately 10,000 bits in width. Various numbers of bits in each control word are routed, by means of control lines, to other functional blocks on the chip to control, e.g., n:1 selectors, shift registers, pass gates, signal inversion, as discussed below. For ease of illustration the control lines are omitted from FIG. 13. However, it will be apparent that the control words may be used in manners well-known in the art to control the various devices and functional blocks.

Control data 102 is loaded with up to 64 control words of the control program generated by a compiler. The compiler is software that receives, as input, a specification of a circuit to be emulated and outputs a control program in the form of equations and control logic to cause the chip to emulate the desired circuit. The words of the control program are executed each emulation cycle, where an emulation cycle is one cycle of the emulated circuit. That is, if a circuit being emulated runs at 1 MHz the emulation cycle is 1.0 uS. This means that all of the steps in the program must complete within 1.0 uS. Since there are a maximum of 64 program steps allowed, the emulator clock would run at 64 MHz maximum. If there are less than 64 program steps, the emulation speed increases accordingly. A detailed description of the approach of using multiple emulator clock cycles per emulated clock cycle, and the advantages of doing so, may be found in related copending patent application Ser. No. 08/242,164.

The emulator includes the ability to lengthen any of the program steps by up to three additional emulator clock cycles. This is useful for interfacing the emulator to target hardware requiring longer access times. When program steps are lengthened this naturally extends the overall program cycle accordingly.

Programmable outputs RAM 104 is a 16K×256 bit random access memory (RAM) to provide the chip with a way to send predefined output values to external circuitry. As shown in FIG. 13, 12 bits exit from the chip to the outside world for use in interfacing to external circuits. The other four bits of each word are "internal use" bits used to control chip functions. Programmable outputs RAM 104 allows the compiler to define "canned" output values for output at specified times within an emulated clock cycle. There are 256 addresses that are sequenced in order according to the emulator clock. There are four times as many word locations in RAM 104 as there are control data word locations in control data 102 because the chip allows for control data cycles to be extended by up to three additional cycles. Thus, each of the 64 control words can be maintained on the output lines of control data 102 for up to four cycles. Meanwhile, the address locations of RAM 104 are still incremented. This allows values from RAM 104 to be output within a control word cycle when the control word is being extended. The rate at which RAM 104 is sequenced, using the present example, is 64 MHz.

Functional blocks 106–112 form the heart of the routing and processing ability of the chip. These blocks are discussed in detail, below. Essentially, blocks 106–110 provide multiplexing and shift register/storing ability for variable values that are fed to HLUs 112 for processing.

Functional block 112 includes 8 logic units, each consisting of four Hydra Logic Processor chips with four outputs, for a total of 32 outputs. These outputs from the 8 internal logic units are included as inputs to 3:1 Selector 114. 3:1 Selector 114's other inputs include signals from the backplane (designated as BPlane in) via 32:1 Selectors 112. This allows any of the 32 backplane signals to be routed to any of the inputs of 3:1 selector 114. The backplane signals are inter-board signals. The board-level design of the logic emulation system is discussed below in connection with FIG. 19. The third set of inputs to 3:1 Selector 114 is from Memory 124. Memory 124 is connected to the output of 3:1 selector 114 to allow the emulation system to emulate a RAM, or multiple RAMs, in the user's circuit design. The outputs of 3:1 Selector 114 are provided to 2:1 Selector 120 and to pin pads in the chip. 2:1 Selector 120 acts to return the signals back to the inputs of the HLUs via the routing arrangement of blocks 106–110. Thus, 3:1 Selector 114 allows the system to select from among three separate signal sources to output to chips both within, and external to, the chip on which the processor function of the emulation system of the present invention is fabricated.

In a preferred embodiment, Memory 124 is a 4K×32 bit RAM. The RAM is addressed from signals generated by the HLUs local to the chip, and external to the chip, via the backplane. One or more bits of the address may be obtained, and stored for use each emulator cycle. The address is built and latched piecemeal over one or more cycles so that the system has wide flexibility in emulating the address logic in the circuit design being emulated. The structures for latching and applying the address are not shown in FIG. 13. Data values for the RAM are obtained from the outputs of the HLUs, from the backplane, or from the RAM, itself.

Register 116 provides for storing the output values from the HLUs so that they may be delayed by one emulator cycle or more. Whether the current variable values, or the stored variable values from register 116, are output is determined by single mode bit 118 attached to the control line of 2:1 selector 120. Single mode bit 118 is obtained from one of the four "internal use" bits of RAM 104 discussed above, thus it is changeable each emulator clock cycle.

32:1 selectors 126, AND gates 128 and RAM 130 allow signals from the HLUs to be selectively output onto the backplane for use by processors on other boards. The signals are placed onto the backplane bus by using open-collector drivers so that the signals from each chip are effectively "wire ORed" onto the backplane. RAM 130 is loaded by the compiler and is used to enable specific signals onto the backplane each emulated clock cycle since one of each of the used control words in RAM 130 is addressed consecutively once each emulated clock cycle.

32:1 selectors 132 are used along with drivers 134 and RAM 136 to output breakpoint control signals. RAM 136 functions similarly to RAM 130 in that it is loaded by the compiler as part of the emulator program and its address is incremented once each emulator clock cycle. Breakpoints are implemented by having the HLUs evaluate equations to check for signal (i.e., variable) states and, upon detecting the desired combination, outputting a high signal that is selected by 32:1 selector 132. 32:1 selector 132 is controlled, as are the other selectors of FIG. 13 except for selector 120, by control signals from control data 102.

The routing and processing of blocks 106–112 will next be discussed in detail.

1. Routing

Functional blocks 106–112 are the core of Hydra Chip 100's routing and processing. Since the chip relies on multiple emulator cycles per emulated cycle it is crucial that data can be quickly and easily routed between the various local and remote (i.e., on-chip and off-chip) processors so that several iterations of processing data with the same logic units (discussed below) can be efficiently achieved.

In FIG. 13, 256 48:1 selectors are used to choose from among 32 internal signal lines and 352 external signal lines. The 32 internal signal lines are fed back from the outputs of the 8 HLUs 112 while the external signal lines are from 11 external processors, each identical to the diagram of FIG. 13, to provide 11×32=352 signals. Thus, the total number of signals entering the 256 48:1 selectors 106 is 352+32=384.

Each of the 384 signals is distributed to 32 inputs in the 256 48:1 selectors. Thus, the total number of inputs in the 48:1 selector group is 32×384=12,288.

The 48:1 selectors output 256 signals to 256 shift registers 108. The routing is one-to-one with each 48:1 selector output feeding a single 64 stage, or 64 bit, shift register input. The combination of 48:1 selector and shift register is referred to as a "pipe." Each stage of each shift register is output so that the number of outputs from the shift register group is 64×256=16,384 outputs. The 16,384 outputs are provided to the 128 1K:1 selectors.

The outputs of the 1K: 1 selectors are sent to 8 HLUs 112. Each HLU receives the outputs from 16 1K:1 selectors.

Figure 14:
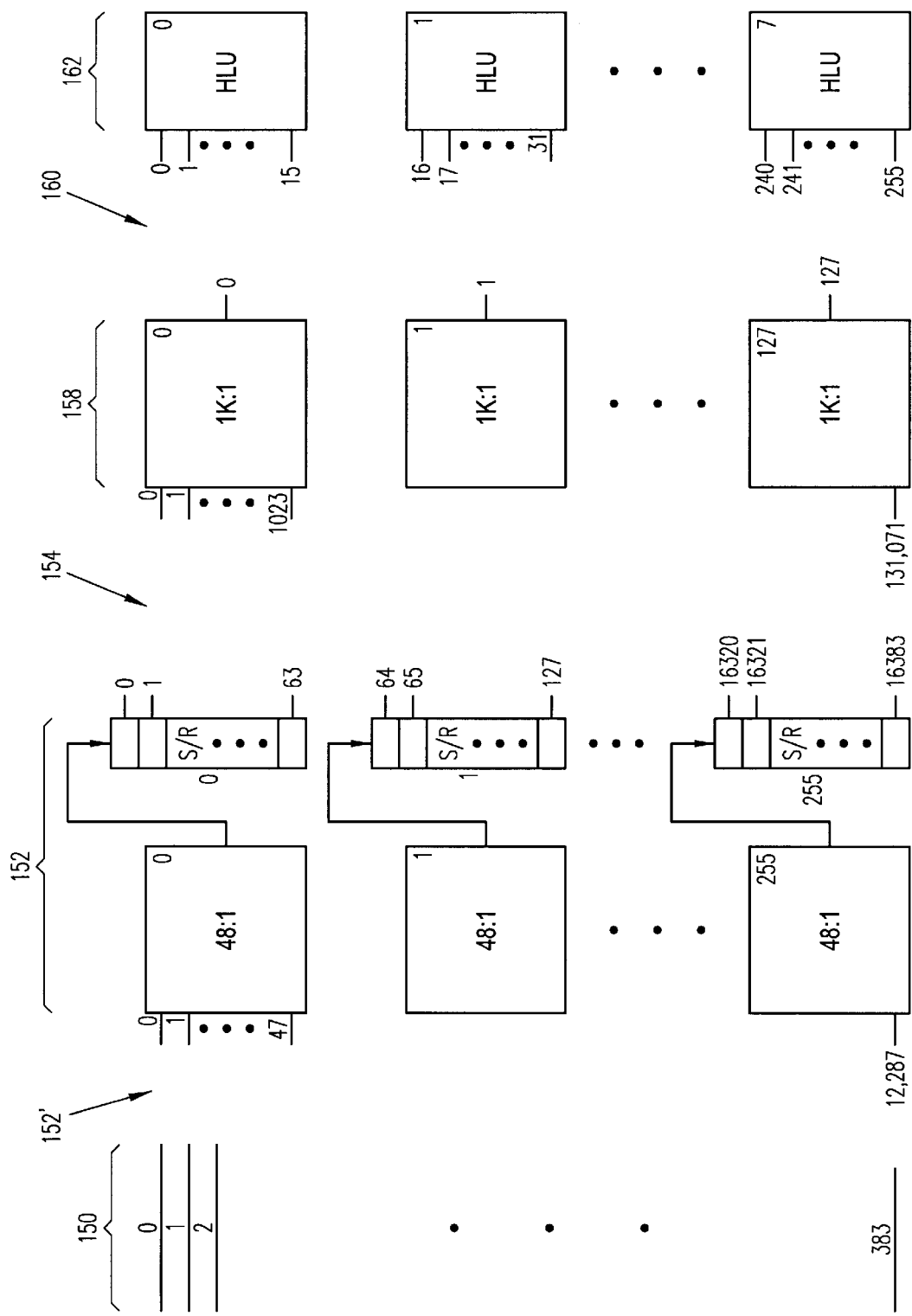
FIG. 14 shows an expanded diagram of the routing of some functional blocks of FIG. 13.

FIG. 14 shows an expanded diagram of the routing of blocks 106–112. In FIG. 14, 384 signals at 150 are provided to pipes at 154. The interconnections between the 384 signals and the pipes is at 152. A preferred interconnection scheme distributes each of the 384 signals to 32 different inputs of the 48:1 selectors. The described interconnection allows for routing each signal to 16 pairs of 64 bit shift registers. The pairs are separated so that the input signal fanouts have the smallest overlap possible. The exact connections are shown in U.S. application Ser. No. 08/496,239, of Chilton et al. entitled "Emulation System Having Multiple Emulated Clock Cycles Per Emulator Clock," filed 06128195, which is herein incorporated by reference.

Connections between pipes at 154 and selectors at 158 are such that consecutive groups of 8 1K:1 selectors receive the same 1024 outputs from a group of 16 shift registers. For example, in the first group of 8 1K:1 selectors (selectors 0–7), each selector receives the same 1024 outputs from shift registers 0–15. In the next group of 8 1K:1 selectors (selectors 8–15), each selector receives the same 1024 outputs from the next 16 shift registers (shift register numbers 16–31) and so on.

Connections at 160 between 1K:1 selectors at 158 and HLUs at 162 are assigned by taking sixteen of the 1K:1 selectors modulo 16. For example, HLU 0 is connected to 1K:1 selectors 0, 16, 32, 48, . . . , 112. HLU 1 is connected to 1K:1 selectors 1, 17, 33, 49, . . . , 113.

Figure 15:
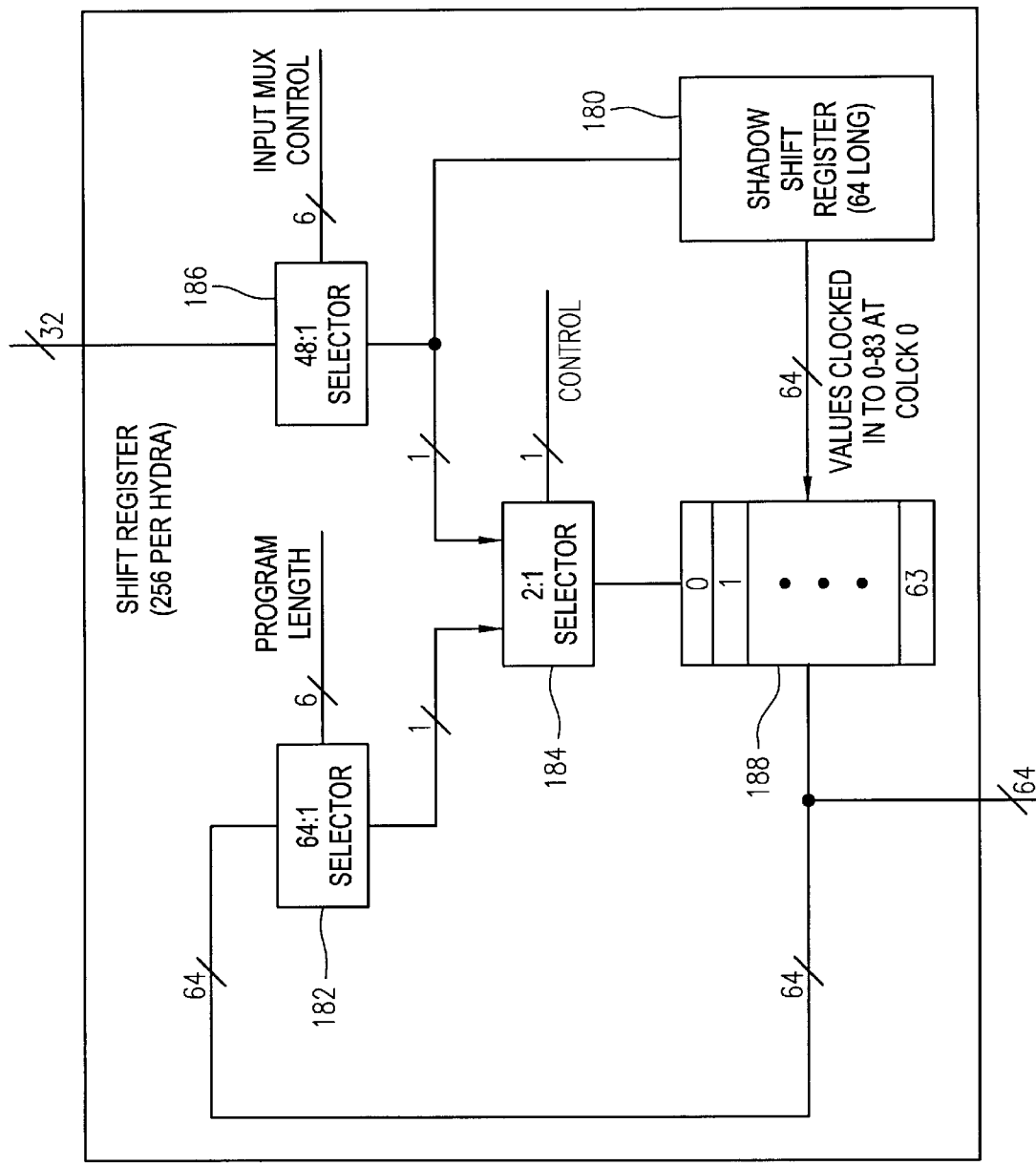
FIG. 15 shows more details of the circuitry of the first functional blocks of FIG. 13.

FIG. 15 shows more details of the circuitry of functional blocks 106 and 108 of FIG. 13. Specifically, FIG. 15 shows the inclusion of a "shadow" shift register 180, 64:1 selector 182 and 2:1 selector 184. 48:1 selector 186 and shift register 188 are the same components discussed above and shown in FIG. 13 as 106 and 108, respectively.

The use of shadow shift register 180 provides distinct advantages in the ability of the emulation system of the present invention to handle logic elements such as flip-flops where the state of the logic element which was computed during the current emulated clock cycle is not required as an input to other logic elements until the next emulated clock cycle. Shift register 188 is used to store results of computations in each of the 64 (maximum) steps in the emulation program. However, a special case occurs where, for example, a flip flop output, or any other "registered" signal, is not required until the next cycle. These registered signals must not be updated for use until the end of the current emulated clock cycle. Thus, the shadow register is used to store the values of these types of registered variables from the time they were generated until the time they are required as inputs to logic functions. At the end of the program cycle, i.e., after all program steps have been executed for the current cycle, the values from shadow shift register 180 are copied into shift register 188 so that the new values for these registered variables are available for use as inputs to the next program cycle. The copying is performed by loading shift register 188 with the parallel outputs of shadow shift register 180. This allows for time-independent routing of all "registered" signals through the emulator since the signals are not required until the following program cycle.

As can be seen from FIG. 15, values from 48:1 selector 186 are routed both to shadow shift register 180 and, selectively, to shift register 188 via 2:1 selector 184. Where the value from 48:1 selector 186 is a registered variable, the registered variable is copied to shadow shift register 180, only, and not to shift register 188. Instead, shift register 188 receives a value from 64:1 selector 182 which is generated during the previous program cycle so that any registered variables that change during the current program cycle are not updated until the next program cycle.

64:1 selector 182 allows values from anywhere within shift register 188 to be routed back to stage 0 of the shift register. This allows flexible access to variable values that are computed within a program cycle. The selection of variable through 64:1 selector 182 is by the six control lines shown connected to 64:1 selector 182 and which are controlled from the control data. Other control signals such as the five input multiplexer (MUX) lines to 48:1 selector 186 and single control line to 2:1 selector 184 also issue from the control data.

2. Processing

Figure 16:
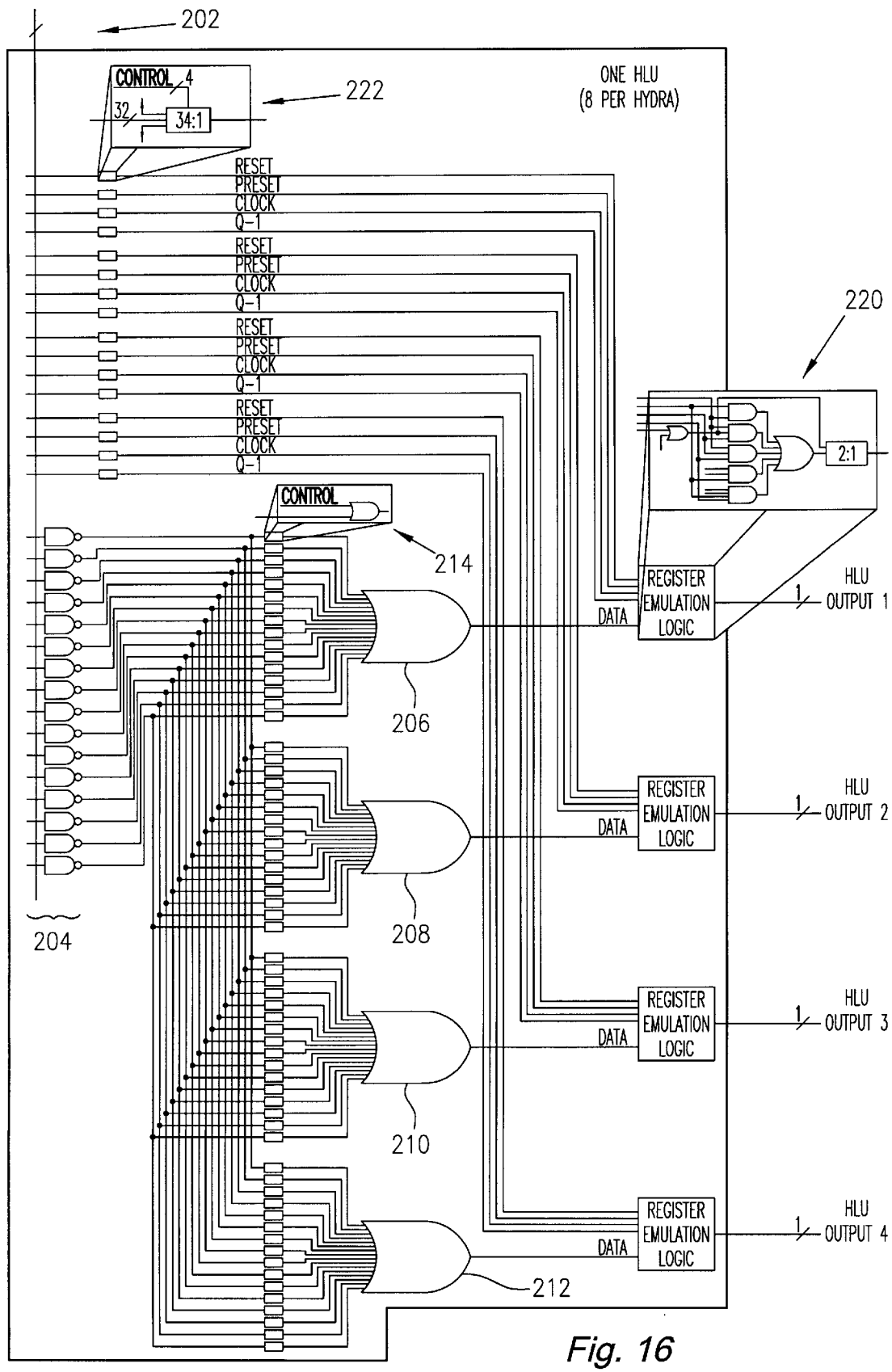
FIG. 16 shows an expanded block diagram of the logic unit block of FIG. 13.
Figure 17:
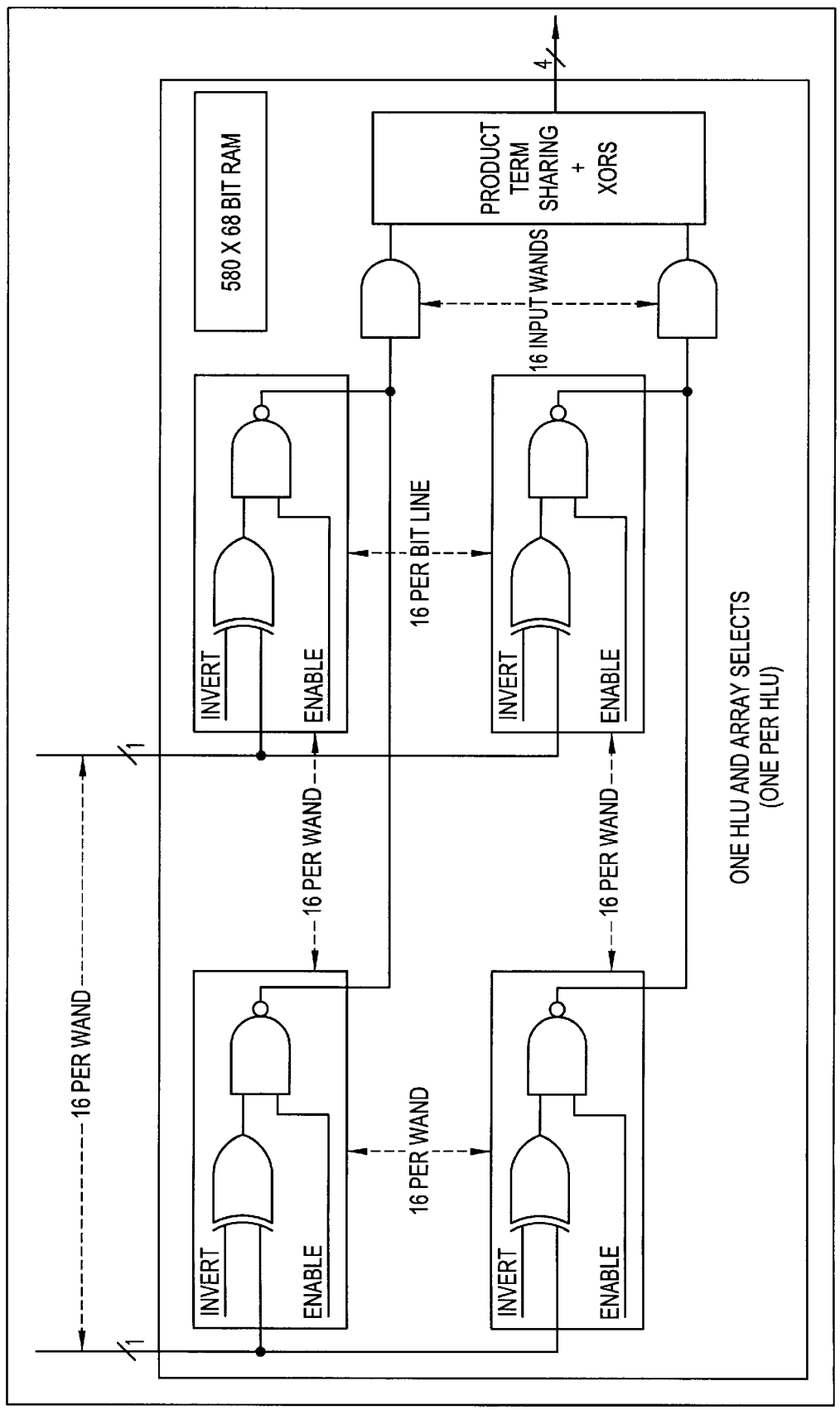
FIG. 17 shows more detail relating to the input wand circuitry of FIG. 16.

Next, FIGS. 16 and 17 are discussed to illustrate details of the Hydra logic units used for processing in the emulation system of the present invention.

FIG. 16 shows an expanded diagram of the logic in block 112 of FIG. 13. In FIG. 16, one or 8 HLUs on the chip is shown. Sixteen inputs from 16 of the 1K:1 selectors enter the HLU at 202. The inverted signals are also provided so that a total of 32 signals is represented by the dark shaded line. The 16 signals are coupled through inverters and pass gates, also called input "words, 11 shown in larger scale and more detail in FIG. 17, to the OR gates 206–212. Each of the 16 signals can be passed through each of the input wands so that any of the signals can be applied to any of the inputs of the OR gates 206–212. Note that each of the lines to the OR gates is provided with a NOR gate such as NOR gate 214 so that each input to the NOR gates can be selectively disabled with the application of a zero, or low, signal.

OR gates 206–212 are used to compute sum-of-products terms to solve Boolean equations that emulate the functions of the user's circuit design. The compiler converts the user circuit design into Boolean equations which are then converted into multiple program steps. The program steps are loaded into the emulation architecture in the form of microcode words in control data 102 of FIG. 13 and control signals in various select RAM throughout the system. In this respect, the system of the present application is similar to the system of copending patent application Ser. No. 08/242,164.

Returning to FIG. 16, register emulation logic 220 is provided at the output of each of the OR gates. Register emulation logic 220 provides specialized control signals to allow the emulator to handle sequential element emulation, such as registers and latches, in an efficient manner. Signals such as "Reset," "Preset, 11 "Clock" and 'IQ-111 represent signals of their well-known counterparts in standard sequential devices. These signals are obtained from the 16 input signals and their inverted signals by using 34:1 selectors as shown, for example, at 222. Note that the 34:1 selectors allow a high or low signal to be selected in addition to the 16 input signals and their inversions. Signal "Q-1" is normally the previous value of what was stored in a register being emulated.

The invert control bit of register emulation logic 220 allows inversion of the data signal according to control data. The P/R control signals determine whether a preset or reset will be controlling when both a preset and reset occur at the same time. The P/R control lines are coupled to control RAM, as are the two control bits to the 2:1 selector of register emulation logic 220. The 2:1 selector provides for a bypass of the register emulation logic when it is not needed.

Figure 18:
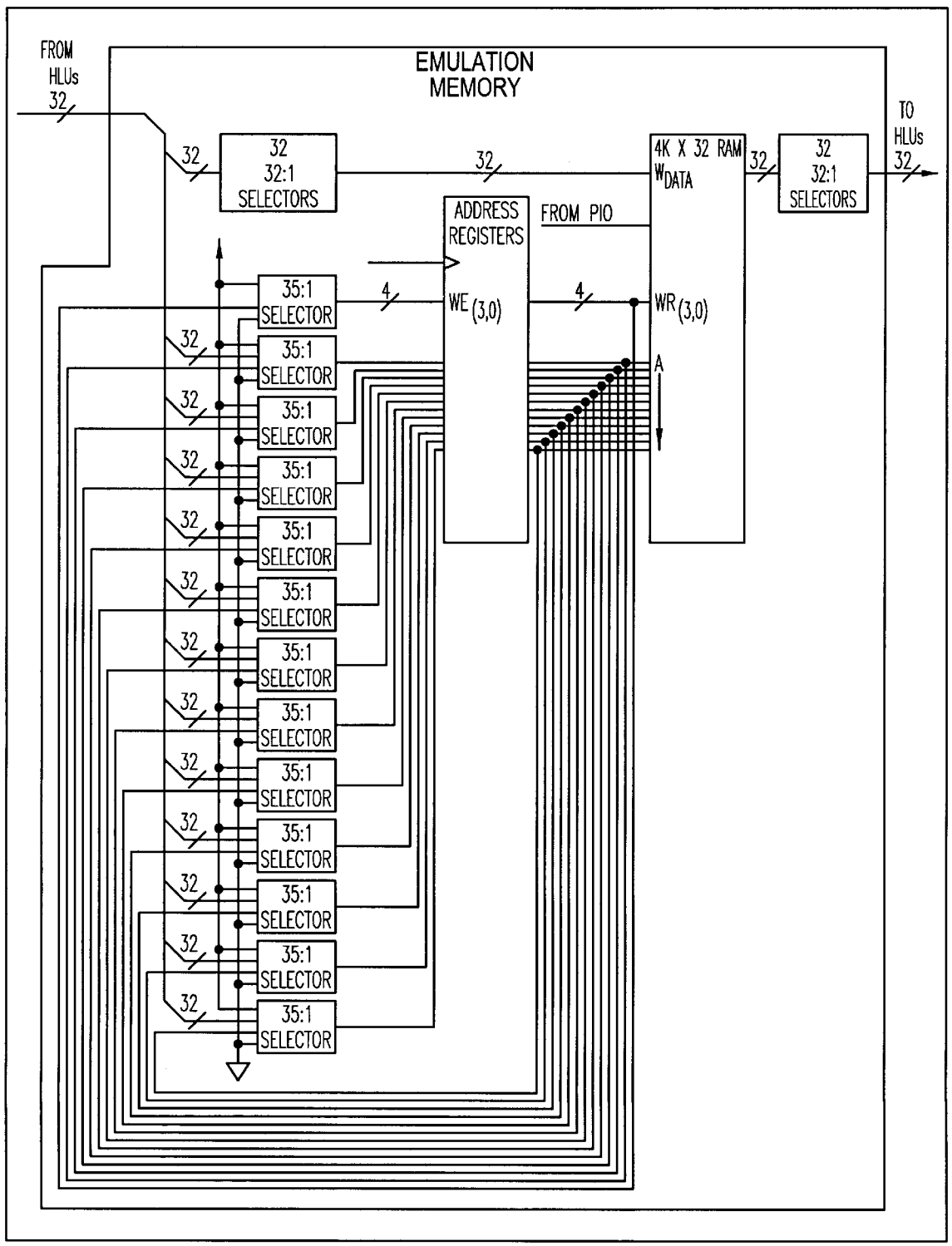
FIG. 18 shows more detail in the emulation memory block of FIG. 13.

FIG. 18 shows more detail in functional block 124, the emulation memory, of FIG. 13. The emulation memory circuitry provides an efficient way for the values generated from the HLUs to be stored and used in addressing the emulation memory. Note that logic analysis subsystem 202 is coupled to the 384 bit bus in a manner similar to the chips of the emulator.

FIG. 19 shows a board level configuration of twelve Hydra processor chips and a portion of the logic analysis subsystem. FIG. 19 includes backplane 250 that can accommodate additional similar boards. Devices (162652) are register transceivers while devices (74FB2033) are backplane interface transceivers.

SUMMARY

The described embodiments of the present invention allow the user to set breakpoints, triggers, and notification events using any of the input and output signals available from the emulator via the 384 bit bus. In addition, the logic analysis subsystem implements additional compiled circuits that reconstruct signals "lost" or reduced" during the compilation phase. These signals may also be used to set breakpoints, triggers, and notification events. Lastly, the logic analysis subsystem is connected to an external workstation or similar controller via a known bus so that the controller can affect the operation of the logic analysis subsystem during emulation.

Other embodiments will be apparent to those skilled in the art from consideration of the specification and practice of the invention disclosed herein. It is intended that the specification and examples be considered as exemplary only, with a true scope of the invention being indicated by the following claims.

```
APPENDIX A
//
// Trace Controller

// Controls reading and writing of the trace RAM.
//
//
`define  SEL_VERSION           3'h0
`define  SEL_CTL               3'h1
`define  SEL_ADDR_CNTR         3'h2
`define  SEL_ADDR_CNTR_SAVE    3'h3
`define  SEL_RESET_ADDR_CNTR   3'h4 module trc_ctl( a,           // latched host address from bus_pld_
                d,           // host data bus
                ds,          // host data strobe
                sel,         // host addr[23:20] = 1XXX
                mclk,        // trc_ctl_clk
                resetb,      // resets all registers to 0
                wr,          // write from host hydra_hout,  // data from hydra to store in ram
                hydra_ep,    // trc step enable, prog[11:8]
                pmode,       // 1=hydra_hout is piped, 0=hydra_hout not piped l_tr_en,     // local trc enable
                c_tr_en,     // chasis trc enable
                g_tr_en,     // global trc enable tcyc_end,    // end of trc user cycle
                th_run,      // indicates when the hydras are running
                emul_th,     // 1=emulation mode, 0=configuration mode
                th_en,       // trc hydra enable; not used
                run,         // not used strap,       // trc_ctl FPGA select dtack_in,   // dtack from other FPGA bogus_out,  // bogus logic output for unused inputs dtack,       // dtack to bus_pld
                trc_done,    // interrupt to bus_pld ram_io,      // ram data bus
                ram_addr,    // addr cntr
                ram_addr2,   // addr from host
                ram_cs0b,    // bank select a[18] or addr_cntr(16)=0
                ram_cs1b,    // bank select a[18] or addr_cntr[16]=1
                ram_oeb,     // 0=read, 1=write
                ram_adscb,   // addr strobe
                ram_wb       // write enable
              );
    input [23:0]  a;
    inout [31:0]  d;
    input         ds;
    input         sel;
    input         mclk;
    input         resetb;
    input         wr;
    input [31:0]  hydra_hout;
```

```
input    [3:0]    hydra_ep;
input             pmode;
input             l_tr_en;
input             c_tr_en;
input             g_tr_en;
input             tcyc_end;
input             th_run;
input             emul_th;
input             th_en;
input             run;
input             strap;
input             dtack_in;

output            bogus_out;
output            dtack;
output            trc_done;

input    [31:0]   ram_io;
output   [15:0]   ram_addr;
output   [15:0]   ram_addr2;
output            ram_cs0b;
output            ram_cs1b;
output            ram_oeb;
output            ram_adscb;
output            ram_wb;

reg               early_dtacklp;
reg               dtack;
reg      [31:0]   din_p;
reg               dout_strobe_p;
reg               dout_strobe_2p;
reg               dout_strobe_3p;
reg      [31:0]   dout;
reg      [31:0]   dout_raw;
reg      [7:00]   ctl_reg;
reg      [3:00]   hydra_ep_p;
reg      [3:00]   hydra_ep_pl;
reg               tcyc_end_p;
reg               tcyc_end_2p;
reg               tcyc_enc_3p;
reg               th_run_p;
reg               th_run_2p;
reg               th_run_3p;
reg               th_run_4p;
reg               th_run_5p;
reg               th_run_6p;
reg               th_run_7p;
reg               th_run_8p;
reg               th_run_9p;
reg               th_run_10p;
reg               th_run_11p;
reg               th_run_4or5p;
reg               gated_trc_en;

tri      [31:0]   d;
tri      [31:0]   ram_io;
tri      [15:0]   ram_addr;
tri      [15:0]   ram_addr2;

wire     [16:0]   addr_cntr;
wire              addr_cntr_17;
wire     [16:0]   addr_cntr_save;
wire              addr_cntr_save_17;
wire     [1:0]    chassis_type;
wire     [1:0]    mode_select;
```

```
        wire [1:0]  trc_step_en_select;
        wire [1:0]  lcg_select;
        wire        reset_addr_cntr;
        wire        reset;
        wire        gated_trc_step_en;
        wire        gated_trc_step_enl;
        wire        mux_sell;
        wire        mux_sel2;
        wire [31:0] ram_d;
        wire        bufoe;
        wire        early_dtack2;
        wire        ram_asb;
        wire        ram_web;
        wire        stop;
        wire [2:0]  lcg;
        wire [3:0]  hydra_ep_muxout;
        wire [3:0]  hydra_ep_muxoutl;
        wire        dtack_mux_out;
        wire        early_dtackl;

/* VERSION REG */
        wire [2:0]  version_reg;
        assign      version_reg = 3'b0;

/* CONTROL REG definition */
        assign chassis_type      =   ctl_reg[7:6];
        assign mode_select       =   ctl_reg[5:4];
        assign trc_step_en_select=   ctl_reg[3:2];
        assign lcg_select        =   ctl_reg[1:0];

assign dtack_mux_out     =   strap ? early_dtackl : early_dtacklp;

assign lcg               =   {l_tr_en, c_tr_en, g_tr_en}
        assign hydra_ep_muxout   =   pmode ? hydra_ep_p  : hydra_ep;
        assign hydra_ep_muxoutl  =   pmode ? hydra_ep_pl : hydra_ep;
        assign gated_trc_step_en =   hydra_ep_muxout[trc_step_en_select] &&
th_run_4or5p
                                 && emul_th;
        assign gated_trc_step_enl = hydra_ep_.muxoutl[trc_step_en_select] &&
th_run_4or5p
                                 && emul_th;
        assign reset             = !resetb;
        assign ram_addr          = mux_sell   ? addr_cntr[15:0] : 16'bz;
        assign ram_addr2         = mux_sel2   ? a[17:2]    : 16'bz;
        assign ram_d             = mux_sel2   ? din_p      : hydra_hout;
        assign ram_io            = bufoe      ? ram_d      : 32'bz;

// lines up data 1 cycle later than dtack
        assign d[31:0]           = (dout_strobe_3p && !wr) ? dout[31:0] : 32'bz;

assign reset_addr_cntr   = a[21] && wr && early_dtack2 &&
                                    (a[4:2] == 'SEL_RESET_ADDR_CNTR);

assign ram_cs0b          = mux_sel2 ? a[18]      : addr_cntr[16];
        assign ram_cslb          = mux_sel2 ? !a[18]     : !addr_cntr[16];

assign ram_adscb         = mux_sel2 ? ram_asb : !(gated_trc_step_enl &&
!stop);
        assign ram_wb            = mux_sel2 ? ram_web : !(gated_trc_step_enl &&
!stop);

assign bogus_out         = a[23]       &a[20:19]    &a[1:0]    run;

rw rw0(mclk, reset, ds, !(sel && (a[22] == strap)), wr, a[21],
               mux_sell, mux_sel2, dout_strobel,
```

```
        dout_strobe2, dout_strobe3, dout_strobe4, early_dtack1,
early_dtack2,
        bufoe, ram_web, ram_oeb, ram_asb);

trc_sm trc_sm0 (mclk, reset, reset_addr_cntr, gated_trc_step_en,
gated_trc_en,
                    tcyc_end_3p, addr_cntr, addr_cntr_17, addr_cntr_save,
                    addr_cntr_save_17, trc_done, mode_select, stop,
                    a, wr, early_dtack2, din_p);

always @(posedge mclk or posedge reset)
    begin
        if (reset)
        begin
            dtack            <= 0;
            early_dtack1p    <= 0;
            dout_strobe_p    <= 0;
            dout_strobe_2p   <= 0;
            dout_strobe_3p   <= 0;
            din_p            <= 32'b0;
            dout             <= 32'b0;
            hydra_ep_p       <= 4'b0;
            hydra_ep_p1      <= 4'b0;
            tcyc_end_p       <= 0;
            tcyc_end_2p      <= 0;
            tcyc_end_3p      <= 0;
            ctl_reg          <= 7'b0;
            th_run_p         <= 0;
            th_run_2p        <= 0;
            th_run_3p        <= 0;
            th_run_4p        <= 0;
            th_run_5p        <= 0;
            th_run_6p        <= 0;
            th_run_7p        <= 0;
            th_run_8p        <= 0;
            th_run_9p        <= 0;
            th_run_10p       <= 0;
            th_run_11p       <= 0;
            th_run_4or5p     <= 0;
            gated_trc_en     <= 0;
        end
        else
        begin
            dtack            <= dtack_in    dtack_mux_out;
            early_dtack1p    <= early_dtack1;
            dout_strobe_p    <= dout_strobe1;
            dout_strobe_2p   <= dout_strobe_p;
            dout_strobe_3p   <= dout_strobe_2p;
            hydra_ep_p       <= hydra_ep;
            hydra_ep_p1      <= hydra_ep;
            tcyc_end_p       <= tcyc_end;
            tcyc_end_2p      <= tcyc_end_p;
            tcyc_end_3p      <= tcyc_end_2p;
            th_run_p         <= th_run;
            th_run_2p        <= th_run_p;
            th_run_3p        <= th_run_2p;
            th_run_4p        <= th_run_3p;
th_run_5p       <= th_run_4p;
th_run_6p       <= th_run_5p;
th_run_7p       <= th_run_6p;
th_run_8p       <= th_run_7p;
th_run_9p       <= th_run_8p;
th_run_10p      <= th_run_9p;
th_run_11p      <= th_run_10p;
            th_run_4or5p     <= pmode ? th_run_4p : th_run_3p;
```

```
        casex (chassis_type) //synopsys parallel_case
        2'b00    : gated_trc_en <= th_run_7p && lcg[lcg_select] && emul_th;
        2'b01    : gated_trc_en <= th_run_9p && lcg[lcg_select] && emul_th;
        2'b10    : gated_trc_en <= th_run_11p && lcg[lcg_select] && emul_th;
        endcase if (ds && sel && wr)
            din_p <= d;

if (dout_strobe1)
            dout[7:0] <= dout_raw[7:0];

if (dout_strobe2)
            dout[15:8] <= dout_raw[15:8];

if (dout_strobe3)
            dout[23:16] <= dout_raw[23:16];

if (dout_strobe4)
            dout[31:24] <= dout_raw[31:24];

if (a[21] && (a[4:2] == 'SEL_CTL) && wr && early_dtack2)
            ctl_reg <= din_p[7:0];
        end
    end always @(a or ctl_reg or ram_io or addr_cntr or addr_cntr_save or
version_reg
            or addr_cntr_17 or addr_cntr_save_17)
    begin
        casex ({a[21], a[4:2]}) //  synopsys parallel_case
        4'b0xxx                          : dout_raw = ram_io;
        {1'b1, 'SEL_VERSION         }    : dout_raw = {29'b0, version_reg};
        {1'b1, 'SEL_CTL             }    : dout_raw = {24'b0, ctl_reg};
        {1'b1, 'SEL_ADDR_CNTR       }    : dout_raw = {14'b0, addr_cntr_17,
addr_cntr];
        {1'b1, 'SEL_ADDR_CNTR_SAVE  }    : dout_raw = {14'b0, addr_cntr_save_17,
                                                       addr_cntr_save];
        default                          : dout_raw = 32'bx;
        endcase
    end endmodule //
// Trace State Machine
// module trc_sm(mclk, reset, reset_addr_cntr, gated_trc_step_en, gated_trc_en,
              tcyc_end_3p, addr_cntr, addr_cntr_17, addr_cntr_save,
              addr_cntr_save_17, trc_done, mode_select, stop,
              a, wr, early_dtack2, din_p);

input           mclk;
    input           reset;
    input           reset_addr_cntr;
    input           gated_trc_step_en;
    input           gated_trc_en;
    input           tcyc_end_3p;
    input [1:0]     mode_select;
    input [23:0]    a;
    input           wr;
    input           early_dtack2;
```

```
input  [31:0]  din_p;
output [16:0]  addr_cntr;
output         addr_cntr_17;
output [16:0]  addr_cntr_save;
output         addr_cntr_save_17;
output         trc_done;
output         stop;

reg    [16:0]  addr_cntr;
reg            addr_cntr_17;
reg    [16:0]  addr_cntr_save;
reg            addr_cntr_save_17;
reg            seen_trc_en;
reg            seen_trc_en_twice;
reg            trc_done;
reg            tcyc_end_4p;
reg            save_addr_cntr_p;
reg            stop;
reg            wr_addr_cntr;
reg            wr_addr_cntr_save;
reg            ld_addr_cntr_p;

wire           inc_addr_cntr;
wire           ld_addr_cntr;
wire           save_addr_cntr;
wire           reset_comb;

assign         inc_addr_cntr  = gated_trc_step_en && !stop;
assign         ld_addr_cntr   = tcyc_end_3p && !seen_trc_en && !gated_trc_en;
assign         save_addr_cntr = tcyc_end_3p && (seen_trc_en || gated_trc_en);
assign         reset_comb     = reset || reset_addr_cntr;

always @(posedge mclk or posedge reset)
begin
   if (reset)
   begin
      tcyc_end_4p        <= 0;
      save_addr_cntr_p   <= 0;
      wr_addr_cntr       <= 0;
      wr_addr_cntr_save  <= 0;
      ld_addr_cntr_p     <= 0;
   end
   else
   begin
      tcyc_end_4p        <= tcyc_end_3p;
      save_addr_cntr_p   <= save_addr_cntr;
      wr_addr_cntr       <= a[21] && (a[4:2]  == `SEL_ADDR_CNTR) && wr
                            && early_dtack2;
      wr_addr_cntr_save  <= a[21] && (a[4:2]  == `SEL_ADDR_CNTR_SAVE) && wr
                            && early_dtack2;
      ld_addr_cntr_p     <= ld_addr_cntr;
   end
end always @(posedge mclk or posedge reset_comb)
begin
   if (reset_comb)
   begin
      seen_trc_en        <= 0;
      seen_trc_en_twice  <= 0;
   end
   else
   begin
      if (tcyc_end_4p)
```

```verilog
            seen_trc_en <= 0;
        else if (gated_trc_en)
            seen_trc_en <= 1;

if (seen_trc_en && gated_trc_en)
            seen_trc_en_twice <= 1;
        end
end always @(posedge mclk or posedge reset_comb)
begin
    if (reset_comb)
    begin
        addr_cntr           <= 17'b0;
        addr_cntr_17        <= 1'b0;
        addr_cntr_save      <= 17'b0;
        addr_cntr_save_17   <= 1'b0;
    end
    else
    begin if (wr_addr_cntr)
        begin
            addr_cntr       <= din_p[16:0];
            addr_cntr_17    <= din_p[17];
        end
        else if (ld_addr_cntr_p)
        begin
            addr_cntr       <= addr_cntr_save;
            addr_cntr_17    <= addr_cntr_save_17;
        end
        else if (inc_addr_cntr)
        begin
            addr_cntr       <= addr_cntr + 1;
            addr_cntr_17    <= &addr_cntr || addr_cntr_17;
        end
        else
        begin
            addr_cntr       <= addr_cntr;
            addr_cntr_17    <= addr_cntr_17;
        end if (wr_addr_cntr_save)
        begin
            addr_cntr_save    <= din_p[16:0];
            addr_cntr_save_17 <= din_p[17];
        end
        else if (save_addr_cntr_p)
        begin
            addr_cntr_save    <= addr_cntr;
            addr_cntr_save_17 <= addr_cntr_17;
        end
        else
        begin
            addr_cntr_save    <= addr_cntr_save;
            addr_cntr_save_17 <= addr_cntr_save_17;
        end end
end always @(posedge mclk or posedge reset_comb)
begin
    if (reset_comb)
        stop <= 0;
```

```
        else
        begin
            casex ({mode_select, stop, ld_addr_cntr}) // synopsys parallel_case
                4'bxxx1  :  stop  <= 0;
                4'bxx10  :  stop  <= 1;
        //single fill
                4'b0000 : stop <= &addr_cntr && gated_trc_step_en;
        //wrap around
                4'b0100 : stop <= (seen_trc_en_twice || (seen_trc_en && gated_trc_en))
                            && tcyc_end_4p;
        //sngl fill int
                4'b1000 : stop <= &addr_cntr && gated_trc_step_en;
                4'b1100 : stop <= 0;
                endcase
        end
end always @(posedge mclk or posedge reset_comb)
begin
    if (reset_comb)
        trc_done <= 0;
    else
    begin
        casex ({mode_select, trc_done}) // synopsys parallel_case
            3'bxx1 : trc_done <= 1;
        //single fill
            3'b000 : trc_done <= (stop && tcyc_end_3p
                        && (seen_trc_en || gated_trc_en));
        //wrap around
            3'b010 : trc_done <= (seen_trc_en_twice 11 (seen_trc_en &&
gated_trc_en))
                            && tcyc_end_4p;
            //sngl fill int
            3'b100  :   trc_done <= (seen_trc_en || gated_trc_en) &&
tcyc_end_3p;
            3'b110  :  trc_done <= 0;
            endcase
        end
    end endmodule //
// Host read/write state machine
//_____ module rw(mclk, reset, ds, csb, wr, reg_or_memN,
        mux_sel1, mux_sel2, dout_strobe1, dout_strobe2, dout_strobe3,
        dout_strobe4, early_dtack1,
        early_dtack2, bufoe, ram_web, ram_oeb, ram_asb);

input       mclk;
    input       reset;
    input           ds;
    input           csb;
    input           wr;
    input           reg_or_memN;  // a[21]
    output          mux_sel1;
    output          mux_sel2;
    output          dout_strobe1;
    output          dout_strobe2;
    output          dout_strobe3;
    output          dout_strobe4;
    output          early_dtack1;
    output          early_dtack2;
    output          bufoe;
```

```verilog
output      ram_web;
output      ram_oeb;
output      ram_asb;

parameter
    RW_IDLE   = 3'h0,
    RW_READ   = 3'h1,
    RW_READ2  = 3'h2,
    RW_READ3  = 3'h3,
    RW_WRITE  = 3'h4,
    RW_WRITE2 = 3'h5,
    RW_WRITE3 = 3'h6;

reg [6:0]   rwstate;
reg         mux_sel1;
reg         mux_sel2;
reg         dout_strobe1;
reg         dout_strobe2;
reg         dout_strobe3;
reg         dout_strobe4;
reg         early_dtack1;
reg         early_dtack2;
reg         bufoe;
reg         ram_web;
reg         ram_oeb;
reg         read_asb;

reg [6:0]   next_rwstate;
reg         next_mux_sel1;
reg         next_mux_sel2;
reg         next_dout_strobe;
reg         next_early_dtack;
reg         next_bufoe;
reg         next_ram_web;
reg         next_ram_oeb;
reg         next_read_asb;

assign ram_asb = read_asb && ram_web;

always @(posedge mclk or posedge reset)
begin
    if (reset)
    begin
        rwstate <= 7'h01;
        mux_sel1 <= 1; // Select the counter
        mux_sel2 <= 0; // Deselect the host address
        dout_strobe1 <= 0;
        dout_strobe2 <= 0;
        dout_strobe3 <= 0;
        dout_strobe4 <= 0;
        early_dtack1 <= 0;
        early_dtack2 <= 0;
        bufoe <= 1;
        ram_web <= 1;
        ram_oeb <= 1;
        read_asb <= 1;
    end
    else
    begin
        rwstate <= next_rwstate;
        mux_sel1 <= next_mux_sel1;
        mux_sel2 <= next_mux_sel2;
        dout_strobe1 <= next_dout_strobe;
        dout_strobe2 <= next_dout_strobe;
        dout_strobe3 <= next_dout_strobe;
```

```
            dout_strobe4  <= next_dout_strobe;
            early_,dtack1 <= next_early__dtack;
            early_dtack2  <= next_early_dtack;
            bufoe <= next_bufoe;
            ram_web <= next_ram_web;
            ram_oeb <= next_ram_oeb;
            read_asb <= next_read_asb;
        end
end always @(rwstate or ds or csb or wr or reg_or_memN)
begin
    next_rwstate      = 7'h00;
    next_mux_sell     = 1;
    next_mux_sel2     = 0;
    next_dou_strobe   = 0;
    next_early_dtack  = 0;
    next_bufoe        = 1;
    next_ram_web      = 1;
    next_ram_oeb      = 1;
    next_rea_asb      = 1;
    case (1'b1) // synopsys parallel_case full_case
    rwstate[RW_IDLE]:
        begin
            if (ds && !csb)
            begin
                if (wr)
                begin
                    next_rwstate[RW_WRITE] = 1'b1;
                end
                else
                begin
                    if (reg_or_memN == 0)
                    begin
                        next_bufoe = 0;
                    end
                        next_rwstate[RW_READ] = 1'b1;
                end if (reg_or_memN  == 0)
                    next_mux_sell     = 0;
            end
            else
            begin
                next_rwstate[RW_IDLE]    1'b1;
            end
        end
        rwstate[RW_READ]:
            begin
              if (reg_or_memN == 0)
              begin
                next_mux_sell = 0;
                next_mux_sel2 = 1;
               next_bufoe = 0;
                next_read_asb = 0;
              end
              next_rwstate[RW_READ2] = 1'b1;
            end
    rwstate[RW_READ2]:
        begin
            /* Assert mux_sel only for memory operation */
            if (reg_or_memN == 0)
            begin
            next_mux_sell = 0;
            next_mux_sel2 = 1;
```

```
                 next_ram_oeb = 0;
              next_bufoe = 0;
                 next_read_asb = 1;
              end
              next_dout_strobe = 1;
              next_early_dtack = 1;
              next_rwstate[RW_READ3] = 1'b1;
           end
        rwstate[RW_READ3]:
           begin
              /* Assert mux_sel only for memory operation */
              if (reg_or_memN == 0)
              begin
                 next_mux_sel1 = 0;
                 next_mux_sel2 = 0;
                 next_ram_oeb = 1;
              next_bufoe = 0;
                 next_read_asb    = 1;
              end
              next_dout_strobe = 0;
              next_early_dtack = 0;
              next_rwstate[RW_IDLE] = 1'b1;
           end
        rwstate[RW_WRITE]:
           begin
              /* Assert mux_sel only for memory operation */
              if (reg_or_memN == 0)
              begin
                 next_mux_sel1 = 0;
                 next_mux_sel2 = 1;
              end
              next_rwstate[RW_WRITE2] = 1'b1;
           end
        rwstate[RW_WRITE2]:
           begin
              /* Assert mux_sel only for memory operation*/
              if (reg_or_memN == 0)
              begin
                 next_mux_sel1 = 0;
                 next_mux_sel2 = 1;
                 next_ram_web = 0;
              end
              next_early_dtack = 1;
              next_rwstate[RW_WRITE3] = 1'b1;
           end
        rwstate[RW_WRITE3]:
              begin
                 /* Assert mux_sel only for memory operation */
                 if (reg_or_memN == 0)
                 begin
                    next_mux_sel1 = 0;
                    next_mux_sel2 = 0;
                    next_ram_web = 1;
                 end
                 next_early_dtack = 0;
                 next_rwstate[RW_IDLE] = 1'b1;
              end
           endcase
     end
endmodule
```

APPENDIX B

Physical Dimension/Limitation:
  -Physical Dimension 3000 x 5750 mils2

- Processor Board thickness = 123 mils
  - Process Board spacing = 4 sm = 1570 mils
  - Tracemem card thickness = 62 mils
  - Highest comp under the Tracemem card = 80 (comp)+ 240(hsink) = 320mils
  - distance from processor board surface to tracemem surface = 738 mils
  - highest comp on the other proc board facing tracemem = 200 mils

- clearance under the tracemem board:
      738 - 320 = 418 mils
  -   clearance above the tracemem board:
      1570 - 123 - 738 - 62 - 200 = 447 mils

- 7C1032 size = 761 x 761 mils2
    QL24x32B size = 1214 x 1214 mils2

Notes:
  - Trace Hydra 12 gets the outputs of the following hydras:
      0, 1, 2, 13, 5, 6, 7, 8, 9, 10, 11
  - Trace Hydra 13 gets the outputs of the following hydras:
      0, 1, 2, 3, 4, 5, 6, 12, 9, 10, 11
  - Outputs of TH 12 goes to inputs of TH13 (and vice versa) so that
    TH13 can get access to outputs of LH 7 and LH 8 which it does not
    have connected directly. This is needed to generate the Breakpoint
    (Trace Enable) condition.

- multiple 32bit chunks can be traced in a user cycle (per Trace
    Hydra). The bits are available at different time slices and at
    different bit positions. It is up the trace hydra to collect these
    bits into a 32-bit word and assert TRACE_STEP_EN to store this word
    into SRAM.

- The relationship of TRACE_EN, TRACE_STEP_EN, and TCYC_END in a user
    cycle is depicted below:

TRACE_EN        _____/^_____
    TRACE_STEP_EN   _/^_____/^_____/^_____/^\____
    TCYC_END        _____/^\__

TRACE_EN is 1 clock cycle long and it could be asserted anywhere in
    the user cycle.

Here, TRACE_STEP_EN shows there are 4 32-bit words being stored into
    the SRAM. This namber does not have to be the same for each Trace
    Hydra. The Address counter in the FPGA is incremented every time we
    see a TRACE_STEP_EN.

TCYC_END indicated the end of the user cycle. If TRACE_EN was
    asserted in this user cycle, then we want to save the 4 words,
    otherwise we want to retract the counter.

- Address Counter Implementation:

```
+----------------------------------+
|                                  |
|   +--------+      +---------+    |
|   |  REG   |      |   CTR   |    |
+--+          +-------+         +--+---> To Ram ADDR
   |CP       |      |CP        |
   +---------+      +----------+
```

```
case 1: Store data for this user cycle
    - If we get TCYC_END and we saw TRACE_EN in this user cycle then
        REG <= CTR;
case 1: Don't store data for this user cycle
    - If we get TCYC_END but we did not see TRACE_EN in this cycle then
        CTR <= REG;

- Address Map
    A22     = Chip Select (This bit is compared with the STRAP; the chip
              responses if A22===STRAP). This is used to differentiate
              between the 2 FPGA's on the Trace SRAM card.
    A21     = Memory/Register Address Space Select
              0 means memory and 1 means register
    A20:A2  = Addresses entities within the above address space
              Note that we have 1 MWords of address space for memory, so we
              need to add window register if we want to support more than
              512K Words of trace memory.
    A1:A0   = Ignored by the chip.

- Registers address: (A21 = 1)
    A20:A0 = 0x00  Version Register           3 bits      R
    A20:A0 = 0x04  Control Register           8 bits      R/W
    A20:A0 = 0x08  Address Counter           17 bits      R
    A20:A0 = 0x0c  Address Counter Save      17 bits      R
    A20:A0 = 0x10  Reset Address Counter      1 bits      W

- Reset Address Counter
        A write with any value to this address causes the Address Counter
        and the Address Counter Save Register to be reset to 0.

- Version Register bit      bit[2:0]
        RevA = 3'b0

- Control Register:

- Chassis Type              bit[7:6]
        00 = single chassis
        01 = single cluster
        10 = super cluster

- Mode Register bit[5:4]
        - WRAP_AROUND_FILL b01
          Continue filling the SRAM and wrap around the address.
          Assert_TRC_DONE at end of user cycle and stop tracing if
          TRACE_EN is 2 cycle long.

- SINGLE_FILL_b00
          Assert TRC_DONE at end of user cycle if saw TRACE_EN and SRAM
          is full.

- SINGLE_FILL_INT b10
          This is used if there is a long pause between 2 successive SRAM
          fill. In this case TRC_DONE is asserted at the end of a user
          cycle where we actually store word(s) into SRAM.
```

```
-   Trace_Step_En Select      bit [3:2]
        00 = PROG[8]
        01 = PROG[9]
        10 = PROG[10]
        11 = PROG[11]

-   G/C/L_TRACE_EN select     bit [1:0]
        00 = G_TRACE_EN       (global)
        01 = C_TRACE_EN       (chassis)
        10 = L_TRACE_EN       (local)
```

- Read/Write Timing from Processor Board

```
Write Timing
SEL     _____/^^^^^^^^^^^^^^^^^^^^^^^^^^^^^^^^^^^^^^^^^^\____
WR      _____/^^^^
ADDR    =====X=========A============X=====A+1=============
DS                    /^^_____/^^_____
DATA    ===============X==========XXXXXXXX==========XXXXX
DTACK                          /^^_____/^^\____

Read Timing
SEL     _____/^^^^^^^^^^^^^^^^^^^^^^^^^^^^^^^^^^^^^^^^^^\____
WR      _____
ADDR    =====X=========A============X=====A+1=============
DS                    /^^_____/^^_____
DATA    XXXXXXXXXXXXXXXXXXXXXXXX====XXXXXXXXXXXXXXXXXXX====XXXX
DTACK                          /^^_____/^^\____
```

- Read/Write Timing from FPGA to SRAM

```
Write timing (Use single Write cycle initiated by ADSC*)
CLK       ____/^^^^^^^^^^^^_____/^^^^^^^^^^^^^^\___
CS*       ^^^^^^^_____/^^^^^^^^^^^^^^^^^^
ADDR      XXXXXXXX=================================XXXXXXXXXXXXXXXXXXX
ADSC*     ^^^^^^^_____/^^^^^^^^^^^^^^^^^^
WH*/WL*   ^^^^^^^_____/^^^^^^^^^^^^^^^^^^
DIN       --------X=================================X-----------------
OE*       _____/^^^^^^^^^^^^^^^^^^^^^^^^^^^^^^^_____

Read timing (Use single Read Access initiated by ADSC*)
CLK       ____/^^^^^^^^^^^^_____/^^^^^^^^^^^^^^\___
CS*       ^^^^^^^_____/^^^^^^^^^^^^^^^^^^
ADDR      XXXXXXXX=================================XXXXXXXXXXXXXXXXXXX
ADSC*     ^^^^^^^_____/^^^^^^^^^^^^^^^^^^
ADV*      ^^^^^^^^^^^^^^^^^^^^^^^^^^^^^^^^^^^^^^^^^^^^^^^^^^^^^^^^^^^
WH*/WL    ^^^^^^^^^^^^^^^^^^^^^^^^^^^^^^^^^^^^^^^^^^^^^^^^^^^^^^^^^^^
DOUT      -----------------X=====================X-----------------
OE*       _____
```

-

What is claimed is:

1. A time-sliced logic emulation system for emulation a user design comprising:
a plurality of logic processor integrated circuits;
a trace memory;
at least one trace processor integrated circuit, each of said at least one trace processor integrated circuit electrically connecting to said trace memory; and
said at least one trace processor integrated circuit comprising logic which computes probe functions, wherein said plurality of logic processor integrated circuits and said at least one trace processor integrated circuit are identical in structure.

* * * * *